US006961701B2

United States Patent
Ogawa et al.

(10) Patent No.: US 6,961,701 B2
(45) Date of Patent: Nov. 1, 2005

(54) VOICE RECOGNITION APPARATUS AND METHOD, AND RECORDING MEDIUM

(75) Inventors: Hiroaki Ogawa, Chiba (JP); Katsuki Minamino, Tokyo (JP); Yasuharu Asano, Kanagawa (JP); Helmut Lucke, Tokyo (JP)

(73) Assignee: Sony Corporation, Tokyo (JP)

( * ) Notice: Subject to any disclaimer, the term of this patent is extended or adjusted under 35 U.S.C. 154(b) by 590 days.

(21) Appl. No.: 09/798,521

(22) Filed: Mar. 3, 2001

(65) Prior Publication Data

US 2001/0037200 A1 Nov. 1, 2001

(30) Foreign Application Priority Data

Mar. 2, 2000 (JP) ...................................... P2000-056999

(51) Int. Cl.[7] ............................................. G10L 15/08
(52) U.S. Cl. ........................ 704/236; 704/239; 704/243; 704/244
(58) Field of Search ................................ 704/236, 237, 704/239, 240, 243, 244, 231, 246, 251, 252, 254, 255, 253, 249, 247

(56) References Cited

U.S. PATENT DOCUMENTS

| 5,329,608 | A | * | 7/1994 | Bocchieri et al. | ............ 704/243 |
| 5,349,645 | A | * | 9/1994 | Zhao | ........................... 704/243 |
| 5,748,840 | A | * | 5/1998 | La Rue | ....................... 704/254 |
| 6,018,736 | A | * | 1/2000 | Gilai et al. | ..................... 707/6 |
| 6,243,678 | B1 | * | 6/2001 | Erhart et al. | ................. 704/249 |
| 6,256,630 | B1 | * | 7/2001 | Gilai et al. | ..................... 707/6 |
| 6,397,179 | B2 | * | 5/2002 | Crespo et al. | .............. 704/242 |
| 6,487,532 | B1 | * | 11/2002 | Schoofs et al. | ............. 704/251 |
| 6,539,353 | B1 | * | 3/2003 | Jiang et al. | ................. 704/254 |

* cited by examiner

Primary Examiner—Susan McFadden
(74) Attorney, Agent, or Firm—Bell, Boyd & Lloyd LLC

(57) ABSTRACT

An extended-word selecting section calculates a score for a phoneme string formed of one more phonemes, corresponding to a user's speech, and searches a large-vocabulary-dictionary for a word having one or more phonemes equal to or similar to those of a phoneme string having a score equal to or higher than a predetermined value. A matching section calculates scores for the word searched for by the extended-word selecting section in addition to a word preliminary word-selecting section. A control section determines a word string as the result of recognition of the speech uttered by the user.

7 Claims, 11 Drawing Sheets

FIG. 7

| NOTATION | PHONEME INFORMATION | LANGUAGE INFORMATION |
|---|---|---|
| INTERU | iNteru | PROPER NOUN |
| OGAWA | ogawa | NAME OF PERSON |
| ⋮ | ⋮ | ⋮ |

VOICE RECOGNITION APPARATUS AND METHOD, AND RECORDING MEDIUM

BACKGROUND OF THE INVENTION

1. Field of the Invention

The present invention relates to speech recognition apparatuses, speech recognition methods and recording media and more particularly, to a speech recognition apparatus, a speech recognition method, and a recording medium which allow highly precise speech recognition to be applied to a large vocabulary.

2. Description of the Prior Art

FIG. 1 shows an example structure of a conventional speech recognition apparatus.

Speech uttered by the user is input to a microphone 1, and the microphone 1 converts the input speech to an audio signal, which is an electric signal. The audio signal is sent to an analog-to-digital (AD) conversion section 2. The AD conversion section 2 samples, quantifies, and converts the audio signal, which is an analog signal sent from the microphone 1, into audio data which is a digital signal. The audio data is sent to a feature extracting section 3.

The feature extracting section 3 applies acoustic processing to the audio data sent from the AD conversion section 2 in units of an appropriate number of frames to extract a feature amount, such as a E1 frequency cepstrum coefficient (MFCC), and sends it to a matching section 4. The feature extracting section 3 can extract other feature amounts, such as spectra, linear prediction coefficients, cepstrum coefficients, and line spectrum pairs.

The matching section 4 uses the feature amount sent from the feature extracting section 3 and refers to an acoustic-model data base 5, a dictionary data base 6, and a grammar data base 7, if necessary, to apply speech recognition, for example, by a continuous-distribution HMM method to the speech (input speech) input to the microphone 1.

More specifically, the acoustic-model data base 5 stores acoustic models indicating acoustic features of each phoneme and each syllable in a linguistic aspect of the speech to which speech recognition is applied. Since speech recognition is applied according to the continuous-distribution hidden-Markov-model (Hand) method, HMM is, for example, used as an acoustic model. The dictionary data base 6 stores a word dictionary in which information (phoneme information) related to the pronunciation of each word (vocabulary) to be recognized is described. The grammar data base 7 stores a grammar rule (language model) which describes how each word input into the word dictionary of the dictionary data base 6 is chained (connected). For example, the grammar rule may be a context free grammar (CFG) or a rule based on statistical word chain probabilities (N-gram).

The matching section 4 connects acoustic models stored in the acoustic-model data base 5 by referring to the word dictionary of the dictionary data base 6 to constitute word acoustic models (word models). The matching section 4 further connects several word models by referring to the grammar rule stored in the grammar data base 6, and uses the connected word models to recognize the speech input to the microphone 1, by the continuous-distribution HMM method according to feature amounts. In other words, the matching section 4 detects a series of word models having the highest of scores (likelihoods) indicating probabilities of observing the time-sequential feature amounts output from the feature extracting section 3, and outputs the word string corresponding to the series of word models as the result of speech recognition.

In other words, the matching section 4 accumulates the probability of occurrence of each feature amount for word strings corresponding to connected word models, uses an accumulated value as a score, and outputs the word string having the highest score as the result of speech recognition.

A score is generally obtained by the total evaluation of an acoustic score (hereinafter called acoustics score given by acoustic models stored in the acoustic☐model data base 5 and a linguistic score (hereinafter called language score) given by the grammar rule stored in the grammar data base 7.

More specifically, the acoustics score is calculated, for example, by the HMM method, for each word from acoustic models constituting a word model according to the probability (probability of occurrence) by which a series of feature amounts output from the feature extracting section 3 is observed. The language score is obtained, for example, by bigram, according to the probability of chaining (linking) between an aimed-at word and a word disposed immediately before the aimed-at word. The result of speech recognition is determined according to the final score (hereinafter called final score) obtained from a total evaluation of the acoustics score and the language score for each word.

Specifically, the final score S of a word string formed of N words is, for example, calculated by the following expression, where wk indicates the k-th word in the word string, A(wk) indicates the acoustics score of the word wk, and L(wk) indicates the language score of the word.

$$S = \sum (A(wk) + Ck \times L(wk)) \tag{1}$$

indicates a summation obtained when k is changed from 1 to N. Ck indicates a weight applied to the language score L(wk) of the word wk. The matching section 4 performs, for example, matching processing for obtaining N which makes the final score represented by the expression (1) highest and a word string w1, w2, . . . , and wN, and outputs the word string w1, w2, . . . , and WN as the result of speech recognition.

With the above-described processing, when the user utters "New York ni ikitai desu," the speech recognition apparatus shown in FIG. 1 calculates an acoustics score and a language score for each word, "New York," "ni," "ikitai," or "desu." When their final score obtained from a total evaluation is the highest, the word string, "New York," "ni," "ikitai," and "desu," is output as the result of speech recognition.

In the above case, when five words, "New," "York," "ni," "ikitai," and "desu," are stored in the word dictionary of the dictionary data base 6, there are 55 kinds of five-word arrangement which can be formed of these five words. Therefore, it can be said in a simple way that the matching section 4 evaluates 55 word strings and determines the most appropriate word string (word string having the highest final score) for the user's utterance among them. If the number of words stored in the word dictionary increases, the number of word strings formed of the words is the number of words multiplied by itself the-number-of-words times. Consequently, a huge number of word strings should be evaluated.

In addition, since the number of words included in utterance is generally unknown, not only word strings formed of all words stored in the word dictionary but word strings formed of one word, two words, and should be evaluated. Therefore, the number of word strings to be evaluated becomes much larger. It is very important to efficiently determine the most likely word string among a huge number of word strings as the result of speech recognition in terms of the amount of calculation and a memory capacity to be used.

To make an efficient use of the amount of calculation and the memory capacity to be used, some measures are taken such as an acoustic branch-cutting technique for stopping score calculation when an acoustics score obtained during a process for obtaining an acoustics score becomes equal to or less than a predetermined threshold, or a linguistic branch-cutting technique for reducing the number of words for which score calculation is performed, according to language scores.

According to these branch-cutting techniques, since words for which score calculation is performed is reduced according to a predetermined determination reference (such as an acoustics score obtained during calculation, described above, and a language score given to a word), the amount of calculation is reduced. If many words are reduced, namely, if a severe determination reference is used, however, even a word which is to be correctly obtained as a result of speech recognition is also removed, and erroneous recognition occurs. Therefore, in the branch-cutting techniques, word reduction needs to be performed with a margin provided to some extent so as not to remove a word which is to be correctly obtained as a result of speech recognition. Consequently, it is difficult to largely reduce the amount of calculation.

When acoustics scores are obtained independently for all words for which score calculation is to be performed, the amount of calculation is large. Therefore, a method has been proposed for making a common use of (sharing) a part of acoustics-score calculation for a number of words. In this sharing method, a common acoustic model is applied to words stored in the word dictionary, having the same first phoneme, from the first phoneme to the sane last phoneme, and acoustic models are independently applied to the subsequent phonemes to constitute one tree-structure network as a whole and to obtain acoustics scores. More specifically, for example, the words, "akita" and "akebono," are considered. When it is assumed that the phoneme information of "akita" is "akita" and that of "akebono" is "akebono," the acoustics scores of the words, "akita" and "akebono," are calculated in common for the first to second phonemes "a" and "k." Acoustics scores are independently calculated for the remaining phonemes "i," "t," and "a" of the word "akita" and the remaining phonemes "e," "b," "o," "n," and "o" of the word "akebono." Therefore, according to this method, the amount of calculation performed for acoustics scores is largely reduced.

In this method, however, when a common part is calculated (acoustics scores are calculated in common), the word for which acoustics scores are being calculated cannot be determined. In other words, in the above example of the words, "akita" and "akebono," when acoustics scores are being calculated for the first and second phonemes "a" and "k," it cannot be determined whether acoustics scores are calculated for the word "akita" or the word "akebono."

In this case, as for "akita," when the calculation of an acoustics score starts for its third phoneme, "i," it can be determined that the word for which the calculation is being performed is "akita." Also as for "akebono," when the calculation of an acoustics score starts for its third phoneme, "e," it can be determined that the word for which the calculation is being performed is "akebono."

Therefore, when a part of acoustics-score calculation is shared, a word for which the calculation is being performed cannot be identified when the acoustics-score calculation starts. As a result, it is difficult to use the above-described linguistic branch-cutting method before the start of acoustics-score calculation. Wasteful calculation may be performed.

In addition, when a part of acoustics-score calculation is shared, the above-described tree-structure network is formed for all words stored in the word dictionary. A large memory capacity is required to hold the network. To make an efficient use of the amount of calculation and the memory capacity to be used, another technique may be taken in which acoustics scores are calculated not for all words stored in the word dictionary but only for words preliminary selected.

Since the preliminary selection is generally applied to many words, simple acoustic models or a simple grammar rule which does not have very high precision is used in terms of a processing speed.

A method for preliminary selection is described, for example, in "A Fast Approximate Acoustic Match for Large Vocabulary Speech Recognition," IEEE Trans. Speech and Audio Proc., vol. 1, pp. 59–67, 1993, written by L. R. Bahl, S. V. De Gennaro, P. S. Gopalakrishnan and R. L. Mercer.

The acoustics score of a word is calculated by using a series of feature amounts of speech. When the starting point or the ending point of a series of a feature amount to be used for calculation is different, an acoustics score to be obtained is also changed. This change affects the final score obtained by the expression (1), in which an acoustics score and a language score are totally evaluated.

The starting point and the ending point of the series of feature amounts corresponding to a word, namely, the boundaries (word boundaries) of words, can be obtained, for example, by a dynamic programming method. A point in the series of a feature amount is set to a candidate for a word boundary, and a score (hereinafter called a word score) obtained by totally evaluating an acoustics score and a language score is accumulated for each word in a word string, which serves as a candidate for a result of speech recognition. The candidates for word boundaries which give the highest accumulated values are stored together with the accumulated values.

When the accumulated values of word scores have been obtained, word boundaries which give the highest accumulated values, namely, the highest scores, are also obtained.

The method for obtaining word boundaries in the above way is called Viterbi decoding or one-pass decoding, and its details are described, for example, in "Voice Recognition Using Probability Model," the Journal of the Institute of Electronics, Information and Communication Engineers, pp. 20–26, Jul. 1, 1988, written by Seiichi Nakagawa.

To effectively perform the above-described preliminary selection, it is very important to determine word boundaries, that is, to determine a starting point in a series (feature-amount series) of a feature amount.

Specifically, in a feature-amount series obtained from a speech "kyouwaiitenkidesune" shown in FIG. 2(A), for example, when a correct word boundary is disposed at time $t_i$ between "kyou" and "wa," if time $t1\_1$, which precedes the correct time $t1$, is selected as a starting point in preliminary selection for the word "wa" following the word "kyou," not only the feature amount of the word "wa" but also the last portion of the feature amount of the word "kyou" affects the preliminary selection. If time $t1+1$, which follows the correct time $t_i$, is selected as a starting point in preliminary selection for the word "wa," the beginning portion of the feature amount of the word "wa" is not used in the preliminary selection.

In either case, if a starting point is erroneously selected, an adverse effect is given to preliminary selection and then to matching processing performed thereafter.

In FIG. 2 (also in FIG. 5 and FIG. 7, described later), time passes in a direction from the left to the right. The starting time of a speech zone is set to 0, and the ending time is set to time T.

In the dynamic programming method, described above, since final word boundaries cannot be determined until word scores (acoustics scores and language scores) have been calculated to the end of a feature-amount series, that is, to the ending time T of the speech zone in FIG. 2, it is difficult to uniquely determine word boundaries which serve as starting points in preliminary selection when the preliminary selection is performed.

To solve this issue, a technique has been proposed in which candidates for word boundaries are held until word scores have been calculated by using a feature-amount series in a speech zone.

In this technique, when a word score is calculated for the word "kyou" with the starting time 0 of the speech zone being used as a start point, and times $t1-1$, $t1$, and $t1+1$ are obtained as candidates for the ending point of the utterance of the word "kyou," for example, these three times $t1$, and $t1+1$ are held and preliminary selection for the next word is executed with each of these times being used as a starting point.

In the preliminary selection, it is assumed that, when the time $t1\_1$ is used as a starting point, two words "wa" and "ii" are obtained; when the time $t1$ is used as a starting point, one word "wa" is obtained; and when the time $t1+1$ is used as a starting point, two words "wa" and "ii" are obtained. It is also assumed that a word score is calculated for each of these words and results shown in FIG. 2(B) to FIG. 2(G) are obtained.

Specifically, FIG. 2(B) shows that a word score is calculated for the word "wa" with the time $t1\_1$ being used as a starting point and time $t2$ is obtained as a candidate for an ending point. FIG. 2(C) shows that a word score is calculated for the word "ii" with the time $t1\_1$ being used as a starting point and time $t2+1$ is obtained as a candidate for an ending point. FIG. 2(D) shows that a word score is calculated for the word "wa" with the time $t1$ being used as a starting point and time $t2+1$ is obtained as a candidate for an ending point. FIG. 2(E) shows that a word score is calculated for the word "wa" with the time $t1$ being used as a starting point and time $t2$ is obtained as a candidate for an ending point. FIG. 2(F) shows that a word score is calculated for the word "wa" with the time $t1+1$ being used as a starting point and time $t2$ is obtained as a candidate for an ending point. FIG. 2(G) shows that a word score is calculated for the word "ii" with the time $t1+1$ being used as a starting point and time $t2+2$ is obtained as a candidate for an ending point. In FIG. 2, $t1\_1 < t1 < t1+1 < t2 < t2+1 < t2+2$.

Among FIG. 2(B) to FIG. 2(G), FIG. 2(B), FIG. 2(E), and FIG. 2(F) show that the same word string, "kyou" and "wa," are obtained as a candidate for a result of speech recognition, and that the ending point of the last word "wa" of the word string is at the time $t2$. Therefore, it is possible that the most appropriate case is selected among them, for example, according to the accumulated values of the word scores obtained up to the time $t2$ and the remaining cases are discarded.

At the current point of time, however, a correct case cannot be identified among a case selected from those shown in FIG. 2(B), FIG. 2(E), and FIG. 2(F), plus cases shown in FIG. 2(C), FIG. 2(D), and FIG. 2(G). Therefore, these four cases need to be held. Preliminary selection is again executed for these four cases.

Therefore, in this technique, word scores need to be calculated while many word-boundary candidates are held until word-score calculation using a feature-amount series in a speech zone is finished. It is not preferred in terms of an efficient use of the amount of calculation and the memory capacity.

Also in this case, when truly correct word boundaries are held as candidates for word boundaries, the same correct word boundaries are finally obtained in principle as those obtained in a case in which the above-described dynamic programming technique is used. If a truly correct word boundary is not held as a candidate for a word boundary, a word having the word boundary as its starting point or as its ending point is erroneously recognized and, in addition, due to this erroneous recognition, a word following the word may be erroneously recognized.

In recent years, acoustic models which depend on (consider) contexts have been used. Acoustic models depending on contexts refer to acoustic models even for the same syllable (or phoneme) which have been modeled as different models according to a syllable disposed immediately before or immediately after. Therefore, for example, a syllable "a" is modeled by different acoustic models between cases in which a syllable disposed immediately before or immediately after is "ka" and "sa."

Acoustic models depending on contexts are divided into those depending on contexts within words and those depending on contexts which extend over words.

In a case in which acoustic models depending on contexts within words are used, when a word model "kyou" is generated by coupling acoustic models "kyo" and "u," an acoustic model "kyo" depending on the syllable "u" coming immediately thereafter (acoustic model "kyo" with the syllable "u" coming immediately thereafter being considered) is used, or an acoustic model "u" depending on the syllable "kyo" coming immediately therebefore is used.

In a case in which acoustic models depending on contexts which extend over words are used, when a word model "kyou" is generated by coupling acoustic models "kyo" and "u," if the word coming immediately thereafter is "wa," an acoustic model "u" depending on the first syllable "wa" of the word coming immediately thereafter. Acoustic models depending on contexts which extend over words are called cross-word models.

When cross-word models are applied to speech recognition which performs preliminary selection, a relationship with a word disposed immediately before a preliminary selected word can be taken into account, but a relationship with a word disposed immediately after the preliminary selected word cannot be considered because the word coming immediately thereafter is not yet determined.

To solve this problem, a method has been developed in which a word which is highly likely to be disposed immediately after a preliminary selected word is obtained in advance, and a word model is created with the relationship with the obtained word taken into account. More specifically, for example, when words "wa," "ga," and "no" are highly likely to be disposed immediately after the word "kyou," the word model is generated by using acoustic models "u" depending on "wa" "ga," and "no," which correspond to the last syllable of word models for the word "kyou."

Since unnecessary contexts are always taken into account, however, this method is not desirable in terms of an efficient use of the amount of calculation and the memory capacity.

For the same reason, it is difficult to calculate the language score of a preliminary selected word with the word disposed immediately thereafter being taken into account.

As a speech recognition method in which not only a word preceding an aimed-at word but also a word following the aimed-at word are taken into account, there has been proposed a two-pass decoding method, described, for example, in "The N-Best Algorithm: An Efficient and Exact Procedure for Finding The Most Likely Sentence Hypotheses," Proc. ICASSP, pp.81–84, 1990, written by R. Schwarts and Y. L. Chow.

FIG. 3 shows an outlined structure of a conventional speech recognition apparatus which executes speech recognition by the two-pass decoding method.

In FIG. 3, a matching section 41 performs, for example, the same matching processing as the matching section 4 shown in FIG. 1, and outputs a word string obtained as the result of the processing. The matching section 41 does not output only one word string serving as the final speech-recognition result among a number of word strings obtained as the results of the matching processing, but outputs a number of likely word strings as candidates for speech-recognition results.

The outputs of the matching section 41 are sent to a matching section 42. The matching section 42 performs matching processing for re-evaluating the probability of determining each word string among the number of word strings output from the matching section 41, as the speech-recognition result. In a word string output from the matching section 41 as a speech-recognition result, since a word has not only a word disposed immediately therebefore but also a word disposed immediately thereafter, the matching section 42 uses cross-word models to obtain a new acoustics score and a new language score with not only the word disposed immediately therebefore but also the word disposed immediately thereafter being taken into account. The matching section 42 determines and outputs a likely word string as the speech-recognition result according to the new acoustics score and language score of each word string among the number of word strings output from the matching section 41.

In the two-pass decoding, described above, generally, simple acoustic models, a word dictionary, and a grammar rule which do not have high precision are used in the matching section 41, which performs first matching processing, and acoustic models, a word dictionary, and a grammar rule which have high precision are used in the matching section 42, which performs subsequent matching processing. With this configuration, in the speech recognition apparatus shown in FIG. 3, the amounts of processing performed in the matching sections 41 and 42 are both reduced and a highly precise speech-recognition result is obtained.

FIG. 3 shows a two-pass-decoding speech recognition apparatus, as described above. There has also been proposed a speech-recognition apparatus which performs multi-pass decoding, in which the same matching sections are added after the matching section 42 shown in FIG. 3.

In two-pass decoding and multi-pass decoding, however, until the first matching processing has been finished, the next matching processing cannot be achieved. Therefore, a delay time measured from when a speech is input to when the final speech-recognition result is output becomes long.

To solve this problem, there has been proposed a method in which, when first matching processing has been finished for several words, subsequent matching processing is performed for the several words with cross-word models being used, and this operation is repeated for other words. The method is described, for example, in "Evaluation of a Stack Decoder on a Japanese Newspaper Dictation Task," Onkoron, 1-R-12, pp.141–142, 1997, written by M. S chuster.

In the speech recognition apparatuses shown in FIG. 1 and FIG. 3, when continuous speech recognition is performed, words to be recognized are limited due to the calculation speeds and the memory capacities of the apparatuses. For example, ViaVoice (trademark) GOLD, speech recognition software developed by IBM, recognizes about 42,000 words in a default condition. The user can add about 20,000 words to be recognized. Therefore, ViaVoice GOLD can recognize more than 60,000 words. Even in this condition, a great number of words, such as many proper nouns, are not to be recognized.

When only a limited number of words are to be speech-recognized, if the user utters a word (hereinafter called an unknown word, as required) which is not to be recognized, various problems occur.

Since the phoneme information of the unknown word has not been input into any used word dictionary, its acoustics score cannot be correctly calculated. In addition, the unknown word is not handled in any used grammar rule, its language score cannot be correctly calculated either. Therefore, when a word string serving as the result of recognition of the user's speech is determined, an error occurs at the unknown word. Furthermore, this error causes another error to occur at a different portion.

Specifically, when the user utters "New York niikitaidesu" as described above, for example, if "New York" are unknown words, the correct acoustics scores and language scores of "New York" cannot be calculated. In addition, since the correct acoustics scores of "New York" cannot be calculated, an error occurs when a word boundary between "New York" and "ni" following them is determined. The error affects the calculation of the acoustics score of another portion.

Words which are frequently used in newspapers and novels are generally selected as words to be recognized in a speech recognition apparatus. It is not sure that the user does not utter words which are not frequently used. Therefore, it is necessary to take some measure for unknown words, or to reduce the number of unknown words as much as possible.

There is a method, for example, in which a topic which the user will talk about is presumed from the user's utterance; words to be recognized are changed according to the result of presumption, and unknown words are nominally reduced. In "Reducing the {OOV} rate in broadcast news speech recognition," Proceedings of International Conference on Spoken Language Processing, 1998, written by Tomas Kemp and Alex Waibel, for example, a method is described in which a sentence data base is searched for a sentence which includes a word (known word) uttered by the user, and words included in the sentence are added to words to be recognized.

To highly precisely presume a topic which the user will talk about from the user's utterance, however, complicated and heavy-load processing is required. In addition, when the presumption of the topic is erroneous, it is possible that many words which the user will utter are removed from words to be recognized. It is also difficult to highly precisely presume all topics which the user will talk about.

In "OOV-detection in large vocabulary system using automatically defined word-fragments as fillers," Proceedings on 6th European conference on speech corrununication and technology, 1999, written by Dietrich Klakow, Georg Rose, and Xavier Aubert, for example, a method is described in which a word which is not to be recognized is divided into fragments such as phonemes constituting the word or a phoneme string formed of several phonemes, and speech recognition is applied to the fragments serving as a pseudo-word.

Since there are not so many phonemes constituting words or not so many phoneme strings, the number of unknown words nominally becomes zero when speech recognition is applied to such phonemes and phoneme strings serving as pseudo-words.

In this case, however, since each phoneme or each phoneme string serves as a unit to be recognized, when a word formed of a series of such units to be recognized is unknown, a grammar rule cannot be applied to the word. This reduces the precision of speech recognition.

In addition, in a case in which matching processing is performed after preliminary selection, when phonemes or phoneme strings are preliminary selected as pseudo-words, if an erroneous preliminary selection of phonemes or phoneme strings occurs, the error reduces the precision of a score obtained in matching processing which is performed thereafter. The reduction of the precision of the score reduces the precision of speech recognition.

The present invention has been made in consideration of the above conditions. Indeed, an object of the present invention is to allow highly precise, high-speed speech recognition to be applied to a large vocabulary.

SUMMARY OF THE INVENTION

The foregoing object is achieved in an embodiment of the present invention through the provision of a speech recognition apparatus for calculating a score indicating the likelihood of a result of speech recognition applied to an input speech and for recognizing the speech according to the score, including a detecting part for detecting a phoneme string formed of one or more phonemes, corresponding to the speech; a searching part for searching for a word having one or more phonemes equal to or similar to those of the phoneme string; a score calculating part for calculating a score at least for the word searched for by the searching part; and a determination part for determining a word string serving as the result of recognition of the speech according to the score calculated for the word.

The searching part may search for a word having one or more phonemes equal to or similar to those of a phoneme string having a score equal to or higher than a predetermined value.

The speech recognition apparatus may be configured such that it further includes a large-vocabulary-dictionary storage part for storing a large-vocabulary word dictionary, and the searching part searches the large-vocabulary word dictionary.

The large-vocabulary word dictionary may store words together with their phoneme information and linguistic information.

The speech recognition apparatus may be configured such that it further includes a selecting part for selecting a word for which the score calculating part calculates a score, among a group of words to which speech recognition is applied, and the score calculating part calculates scores for the word searched for by the searching part and for the word selected by the selecting part.

The foregoing object is achieved in another embodiment of the present invention through the provision of a speech recognition method for calculating a score indicating the likelihood of a result of speech recognition applied to an input speech and for recognizing the speech according to the score, including a detecting step of detecting a phoneme string formed of one or more phonemes, corresponding to the speech; a searching step of searching for a word having one or more phonemes equal to or similar to those of the phoneme string; a score calculating step of calculating a score at least for the word searched for in the searching step; and a determination step of determining a word string serving as the result of recognition of the speech according to the score calculated for the word.

The foregoing object is achieved in still another embodiment of the present invention through the provision of a recording medium storing a program which makes a computer execute speech-recognition processing for calculating a score indicating the likelihood of a result of speech recognition applied to an input speech and for recognizing the speech according to the score, the program including a detecting step of detecting a phoneme string formed of one or more phonemes, corresponding to the speech; a searching step of searching for a word having one or more phonemes equal to or similar to those of the phoneme string; a score calculating step of calculating a score at least for the word searched for in the searching step; and a determination step of determining a word string serving as the result of recognition of the speech according to the score calculated for the word.

According to the speech recognition apparatus, the speech recognition method, and the recording medium of the present invention, a phoneme string formed of one or more phonemes is detected correspondingly to a speech, and a word having one or more phonemes equal to or similar to those of the phoneme string are searched for. A scores is calculated at least for the word searched for, and a word string serving as the result of recognition of the speech is determined according to the calculated score.

DESCRIPTION OF THE DRAWINGS

FIG. 7 is a view showing contents of a large-vocabulary dictionary of a large-vocabulary-dictionary data base 36 shown in FIG. 6;

DETAILED DESCRIPTION OF THE PREFERRED EMBODIMENTS

Figure 1:
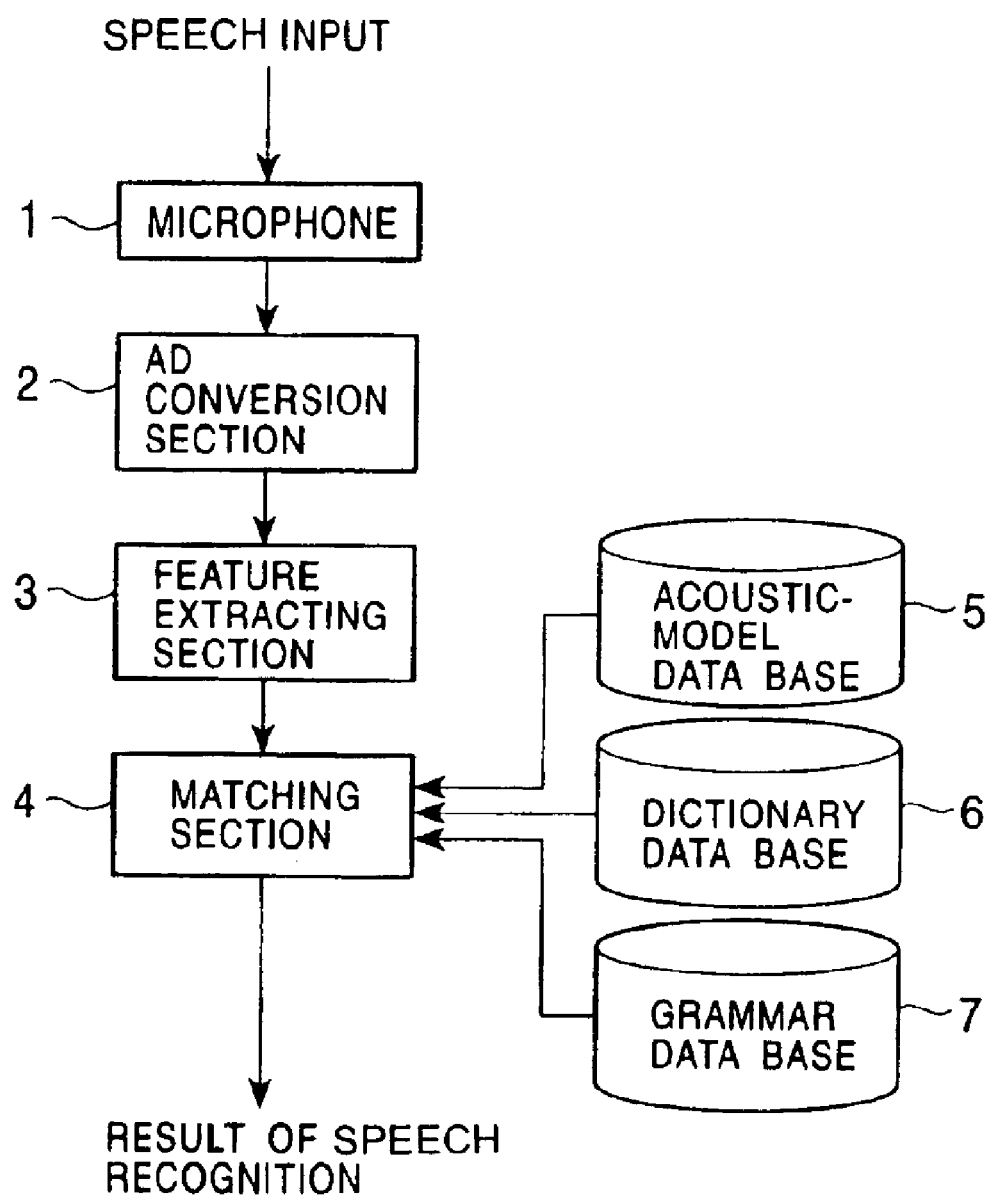
FIG. 1 is a block diagram of a conventionally known speech recognition apparatus.
Figure 4:
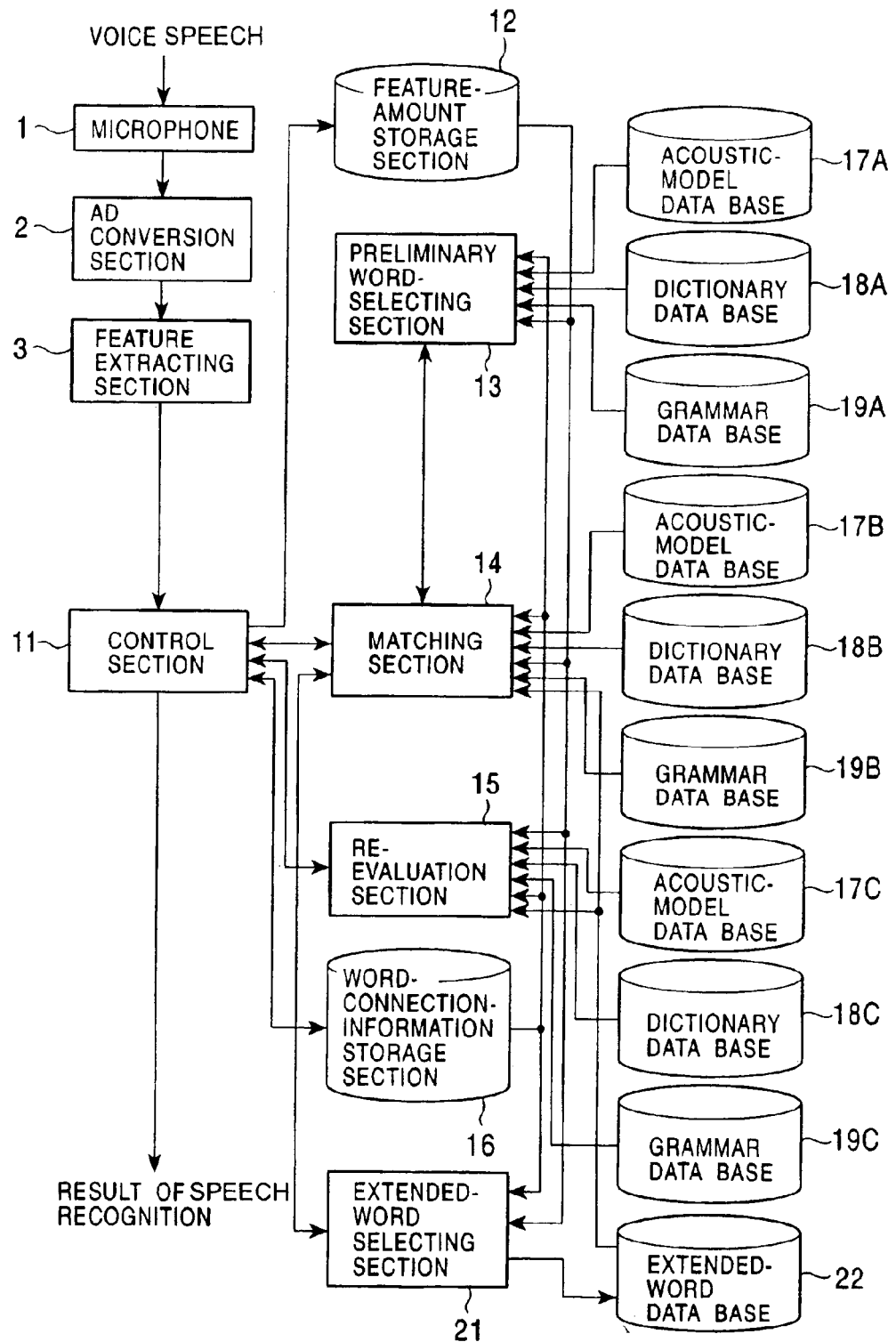
FIG. 4 is a block diagram of a speech recognition apparatus according to an embodiment of the present invention.

FIG. 4 shows an example structure of a speech recognition apparatus according to an embodiment of the present invention. In FIG. 4, the same symbols as those used in FIG. 1 are assigned to the portions corresponding to those shown in FIG. 1, and a description thereof will be omitted.

Series of feature amounts of the speech uttered by the user, output from a feature extracting section 3 are sent to a control section 11 in units of frames. The control section 11 sends the feature amounts sent from the feature extracting section 3, to a feature-amount storage section 12.

The control section 11 controls a matching section 14 and a re-evaluation section 15 by referring to word-connection information stored in a word-connection-information storage section 16. The control section 11 also generates word-connection information according to acoustics scores and language scores obtained in the matching section 14 as the results of the same matching processing as that performed in the matching section 4 shown in FIG. 1 and, by that word-connection information, updates the storage contents of the word-connection information storage section 16. The control section 11 further corrects the storage contents of the word-connection-information storage section 16 according to the output of the re-evaluation section 15. In addition, the control section 11 determines and outputs the final result of speech recognition according to the word-connection information stored in the word-connection information storage section 16.

The feature-amount storage section 12 stores series of feature amounts sent from the control section 11 until, for example, the result of user's speech recognition is obtained. The control section 11 sends a time (hereinafter called an extracting time) when a feature amount output from the feature extracting section 3 is obtained with the starting time of a speech zone being set to a reference (for example, zero), to the feature-amount storage section 12 together with the feature amount. The feature-amount storage section 12 stores the feature amount together with the extracting time. The feature amount and the extracting time stored in the feature-amount storage section 12 can be referred to, by a preliminary word-selecting section 13, the matching section 14, the re-evaluation section 15, and an extended-word selecting section 21.

In response to a request from the matching section 14, the preliminary word□selecting section 13 performs preliminary word-selecting processing for selecting one or more words to which the matching section 14 applies matching processing, with the use of the feature amounts stored in the feature-amount storage section 12 by referring to the word-connection-information storage section 16, an acoustic-model data base 17A, a dictionary data base 18A, and a grammar data base 19A, if necessary.

Under the control of the control section 11, the matching section 14 applies matching processing to the words obtained by the preliminary word-selecting processing in the preliminary word-selecting section 13 and to words stored in an extended-word data base 22, with the use of the feature amounts stored in the feature-amount storage section 12 by referring to the word-connection-information storage section 16, an acoustic-model data base 17B, a dictionary data base 18B, and a grammar data base 19B, if necessary, and sends the result of matching processing to the control section 11.

Under the control of the control section 11, the re-evaluation section 15 re-evaluates the word-connection information stored in the word-connection-information storage section 16, with the use of the feature amounts stored in the feature-amount storage section 12 by referring to an acoustic-model data base 17C, a dictionary data base 18C, a grammar data base 19C, and the extended-word data base 22, if necessary, and sends the result of re-evaluation to the control section 11.

The word-connection-information storage section 16 stores the word-connection information sent from the control section 11 until the result of user's speech recognition is obtained.

The word-connection information indicates connection (chaining or linking) relationships between words which constitute word strings serving as candidates for the final result of speech recognition, and includes the acoustics score and the language score of each word and the starting time and the ending time of the utterance corresponding to each word.

Figure 5:
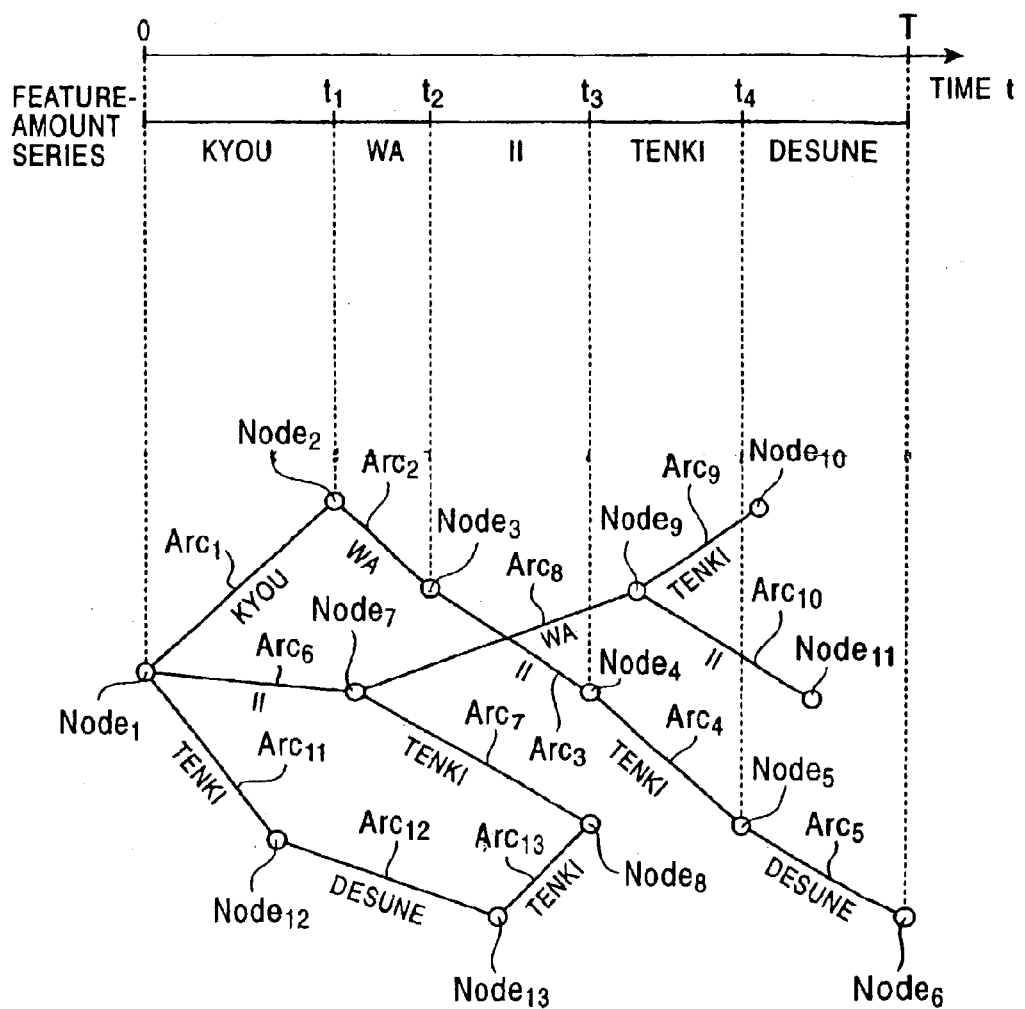
FIG. 5 is a view showing word-connection information in accordance with the teachings of the present invention.

FIG. 5 shows the word-connection information stored in the word-connection-information storage section 16 by using a graph structure.

In the embodiment shown in FIG. 5, the graph structure indicating the word-connection information is formed of arcs (portions indicated by segments connecting marks ! in FIG. 5) indicating words and nodes (portions indicated by marks ! in FIG. 5) indicating boundaries between words.

Nodes have time information which indicates the extracting time of the feature amounts corresponding to the nodes. As described above, an extracting time shows a time when a feature amount output from the feature extracting section 3 is obtained with the starting time of a speech zone being set to zero. Therefore, in FIG. 5, the start of a speech zone, namely, the time information which the node Node 1 corresponding to the beginning of a first word has is zero. Nodes can be the starting ends and the ending ends of arcs. The time information which nodes (starting-end nodes) serving as starting ends have or the time information which nodes (endingend nodes) serving as ending ends have are the starting time or the ending time of the utterances of the words corresponding to the nodes, respectively.

In FIG. 5, time passes in the direction from the left to the right. Therefore, 20 between nodes disposed at the left and right of an arc, the left-hand node serves as the starting-end node and the right-hand node serves as the ending-end node.

Arcs have the acoustics scores and the language scores of the words corresponding to the arcs. Arcs are sequentially connected by setting an ending node to a starting node to form a series of words serving as a candidate for the result of speech recognition.

More specifically, the control section 11 first connects the arcs corresponding to words which are likely to serve as the results of speech recognition to the node Node1 indicating the start of a speech zone. In the embodiment shown in FIG. 5, an arc Arc1 corresponding to "kyou," an arc Arc6 corresponding to "ii," and an arc Arc11 corresponding to "tenki" are connected to the node Node 1. It is determined according to acoustics scores and language scores obtained by the matching section 14 whether words are likely to serve as the results of speech recognition.

Then, in the same way, the arcs corresponding to likely words are connected to a node Node2 serving as the ending end of the arc Arc1 corresponding to "kyo," to an ending node Node7 serving as the ending end of the arc Arc6 corresponding to "ii," and to a node Node12 serving as the ending end of the arc Arc, corresponding to "tenki."

Arcs are connected as described above to form one or more passes formed of arcs and nodes in the direction from the left to the right with the start of the speech zone being used as a starting point. When all passes reach the end (time T in the embodiment shown in FIG. 5) of the speech zone, for example, the control section 11 accumulates the acoustics scores and the language scores which arcs constituting each pass formed from the start to the end of the speech zone have, to obtain final scores. The series of words corresponding to the arcs constituting the pass which has the highest final score is determined to be the result of speech recognition and output.

Specifically, in FIG. 5, when the highest final score is obtained for a pass formed of the node Node1, the arc Arc1 corresponding to "kyou," the node Node2, the arc Arc2 corresponding to "wa," a node Node3, an arc Arc3 corresponding to "ii," a node Node4, an arc Arc4 corresponding to "tenki," a node Node5, an arc ArcS corresponding to "desune," and a node Node6, for example, a series of words, "kyou," "wa," "ii," "tenki," and "desune," is output as the result of speech recognition.

In the above case, arcs are always connected to nodes disposed within the speech zone to form a pass extending from the start to the end of the speech zone. During a process for forming such a pass, it is possible that, when it is clear from a score for a pass which has been made so far that the pass is inappropriate as the result of speech recognition, forming the pass is stopped (an arc is not connected any more).

According to the above pass forming rule, the ending end of one arc serves as the starting-end nodes of one or more arcs to be connected next, and passes are basically formed as branches and leaves spread. There is an exceptional case in which the ending end of one arc matches the ending end of another arc, namely, the ending-end node of an arc and the ending end of another arc are used as an identical node in common.

When bigram is used as a grammar rule, if two arcs extending from different nodes correspond to an identical word, and the same ending time of the utterance of the word is used, the ending ends of the two arcs match.

In FIG. 5, an arc Arc7 extending from a node Node7 used as a starting end and an arc Arc 13 extending from a node Node 13 used as a starting point both dictionary data base 18A stores one piece of phoneme information for each word, the dictionary data base 18B stores a number of pieces of phoneme information for each word, and the dictionary data base 18C stores more pieces of phoneme information for each word. The grammar data base 19A stores a simple grammar rule, the grammar data base 19B stores a highly precise grammar rule, and the grammar data base 19C stores a more highly precise grammar rule.

The preliminary word-selecting section 13, which refers to the acoustic-model data base 17A, the dictionary data base 18A, and the grammar data base 19A, obtains acoustics scores and language scores quickly for many words although precision is not high. The matching section 14, which refers to the acoustic-model data base 17B, the dictionary data base 18B, and the grammar data base 19B, obtains acoustics scores and language scores quickly for a certain number of words with high precision. The re-evaluation section 15, which refers to the acoustic-model data base 17C, the dictionary data base 18C, and the grammar data base 19C, obtains acoustics scores and language scores quickly for a few words with higher precision.

The precision of the acoustic models stored in the acoustic-model data bases 17A to 17C are different in the above description. The acoustic-model data bases 17A to 17C can store the same acoustic models. In this case, the acoustic-model data bases 17A to 17C can be integrated into one acoustic-model data base. In the same way, the word dictionaries of the dictionary data bases 18A to 18C can store the same contents, and the grammar data bases 19A to 19C can store the same grammar rule.

The extended-word selecting section 21 achieves extended-word selecting processing in response to a request from the matching section 14. The extended-word selecting section 21 selects words (hereinafter called extended words, if necessary) to which the matching section 14 applies matching processing, among words (unknown words) other than those which have been input into the word dictionary of the dictionary data bases 18A to 18C (as described above, the dictionary data bases 18A to 18C store the same word dictionary), and inputs the selected words into the extended-word data base 22.

When a one-pass decoder 31 receives a request for extended-word selecting processing from the matching section 14, the one-pass decoder 31 reads a required featured-dictionary data base 18A. The word dictionary of the dictionary data base 18C stores highly precise phoneme information to which more precise processing can be applied than that applied to the phoneme information stored in the word dictionary of the dictionary data base 18B. More specifically, when only one piece of phoneme information (reading) is stored for each word in the word dictionary of the dictionary data base 18A, for example, a number of pieces of phoneme information is stored for each word in the word dictionary of the dictionary data base 18B. In this case, for example, more pieces of phoneme information is stored for each word in the word dictionary of the dictionary data base 18C.

Concretely, for example, for the word "ohayou," one piece of phoneme information, "ohayou," is stored in the word dictionary of the dictionary data base 18A, "ohayoo" and "ohayo" as well as "ohayou" are stored as phoneme information in the word dictionary of the dictionary data base 18B, and "hayou" and "hayoo" in addition to "ohayou," "ohayoo," and "ohayo" are stored as phoneme information in the word dictionary of the dictionary data base 18C.

The grammar data bases 19A, 19B, and 19C basically store a grammar rule such as that stored in the grammar data base 7 shown in FIG. 1, described above.

The grammar data base 19B stores a highly precise grammar rule to which more precise processing can be applied than that applied to a grammar rule stored in the grammar data base 19A. The grammar data base 19C stores a highly precise grammar rule to which more precise processing can be applied than that applied to the grammar rule stored in the grammar data base 19B. More specifically, when the grammar data base 19A stores, for example, a grammar rule based on unigram (occurrence probabilities of words), the grammar data base 19B stores, for example, bigram (occurrence probabilities of words with a relationship with words disposed immediately therebefore being taken into account). In this case, the grammar data base 19C stores, for example, a grammar rule based on trigram (occurrence probabilities of words with relationships with words disposed immediately therebefore and words disposed one more word before being taken into account) and a context-free grammar.

As described above, the acoustic-model data base 17A stores one-pattern acoustic models for each phoneme and syllable, the acoustic-model data base 17B stores plural-pattern acoustic models for each phoneme and syllable, and the acoustic-model data base 17C stores more-pattern acoustic models for each phoneme and syllable. The correspond to "tenki," and the same ending time of the utterance is used, the ending nodes thereof are used as an identical node Node8 in common.

It is also possible that nodes are always not used in common. In the viewpoint of the efficient use of a memory capacity, it is preferred that two ending 5 nodes may match.

In FIG. 5, bigram is used as a grammar rule. Even when other rules, such as trigram, are used, it is possible to use nodes in common.

The preliminary word-selecting section 13, the matching section 14, the re-evaluation section 15, and the extended-word selecting section 21 can refer to the word-connection information stored in the word-connection-information storage section 16, if necessary.

Back to FIG. 4, the acoustic-model data bases 17A, 17B, and 17C basically store acoustic models such as those stored in the acoustic-model data base 5 shown in FIG. 1, described before.

The acoustic-model data base 17B stores highly precise acoustic models to which more precise processing can be applied than that applied to acoustic models stored in the acoustic-model data base 17A. The acoustic-model data base 17C stores highly precise acoustic models to which more precise processing can be applied than that applied to the acoustic models stored in the acoustic-model data base 17B. More specifically, when the acoustic-model data base 17A stores, for example, one-pattern acoustic models which do not depend on the context for each phoneme and syllable, the acoustic-model data base 17B stores, for example, acoustic models which depend on the context extending over words, namely cross-word models as well as acoustic models which do not depend on the context for each phoneme and syllable. In this case, the acoustic-model data base 17C stores, for example, acoustic models depending on the context within words in addition to acoustic models which do not depend on the context and cross-word models.

The dictionary data base 18A, 18B, and 18C basically store a word dictionary such as that stored in the dictionary data base 6 shown in FIG. 1, described above.

Specifically, the same set of words is stored in the word dictionaries of the dictionary data bases 18A to 18C. The word dictionary of the dictionary data base 18B stores highly precise phoneme information to which more precise processing can be applied than that applied to phoneme information stored in the word dictionary of the amount series from the feature-amount storage section 12, and performs one-pass decoding with the use of the feature amount by referring to an acoustic-model data base 33, a dictionary data base 34, and a grammar data base 35, if necessary.

The acoustic-model data base 33 stores acoustic models indicating acoustic features in a linguistic aspect, such as phonemes and syllables, of speech to be recognized, in the same way as the acoustic-model data base 5 shown in FIG. 1.

The dictionary data base 34 handles fragments as pseudo-words, such as phonemes constituting words and phoneme strings formed of several phonemes, formed by dividing each word input into a large-vocabulary dictionary of a large-vocabulary-dictionary data base 36, described later and stores a pseudo-word dictionary in which phoneme information related to the pronunciation of the pseudo-words is described. Since there are not so many phonemes constituting words or not so many phoneme strings, as described above, not so many pseudo-words are input into the pseudo-word dictionary.

The grammar data base 35 stores, for example, a bigram or a trigram serving as a grammar rule which describes how pseudo-words stored in the pseudo-word dictionary of the dictionary data base 34 chain to form words stored in the large-vocabulary-dictionary data base 36.

The one-pass decoder 31 connects acoustic models stored in the acoustic-model data base 5 by referring to the pseudo-word dictionary of the dictionary data base 34 to form the acoustic models (pseudo-word models) of pseudo-words. The one-pass decoder 31 also connects several pseudo-word models by referring to the grammar rule stored in the grammar data base 7, and recognizes the speech input to the microphone 1 in units of phonemes, each of which is a phonemic element serving as a pseudo-word or a set of several phonemic elements, by the Viterbi decoding method according to the feature amounts with the use of the pseudo-word models connected as described above. In other words, the one-pass decoder 31 detects a series of pseudo-word models having the highest of scores (likelihoods) indicating probabilities of observing the time-sequence feature amount output from the feature-amount storage section 12, and outputs the phoneme string corresponding to the series of pseudo-word models as a candidate for a result of recognition of the speech input to the microphone 1.

Since the one-pass decoder 31 cannot detect the end-point portion of a word stored in the large vocabulary dictionary of the large-vocabulary-dictionary data base 36 in the feature-amount series sent to the one-pass decoder 31, it outputs in each frame a phoneme string obtained from the feature-amount series, from the beginning of the speech zone to the frame.

A searching section 32 applies so-called vague search to the large-vocabulary dictionary of the large-vocabulary-dictionary data base 36 with phoneme strings sent from the one-pass decoder 31 and having scores equal to or higher than a predetermined threshold being used as keywords. The large-vocabulary-dictionary data base 36 stores a large-vocabulary dictionary in which a huge number of words which are not input into the word dictionary of the dictionary data bases 18A to 18C have been input. The searching section 32 searches the large-vocabulary dictionary for a word having phonemes similar to those of the phoneme strings.

The large-vocabulary dictionary stores, as shown in FIG. 7, the notation of each word, serving as identification information for identifying the word, and correspondingly thereto, the phoneme information of the word and the linguistic information (language information), such as a part of speech, of the word.

The searching section 32 searches the large-vocabulary dictionary of the large-vocabulary-dictionary data base 36 for a word having phoneme information equal to or similar to that of each phoneme string sent from the one-pass decoder 31, sends the word to the extended-word data base 22 as an extended word, and stores the word in it. Specifically, the searching section 32 sends the phoneme information and the language information of an extended word to the extended-word data base 22 and stores them in it.

It is possible that, as vague search performed by the searching section 32, a method disclosed in "Agrep—a fast approximate pattern-matching tool," Proceedings of USENIX Technical Conference, pp.153–162, San Francisco, January, 1992, written by Sun Wu and Udi Manber, is employed.

Back to FIG. 4, the extended-word data base 22 temporarily stores extended words sent from the extended-word selecting section 21 as described above.

Speech recognition processing executed by the speech recognition apparatus shown in FIG. 4 will be described next by referring to a flowchart shown in FIG. 8.

When the user utters, the uttered speech is converted to a digital speech data through a microphone 1 and an AD conversion section 2, and is sent to the feature extracting section 3. The feature extracting section 3 sequentially extracts a speech feature amount from the sent speech data in units of frames, and sends it to the control section.

The control section 11 recognizes a speech zone by some technique, relates a series of feature amounts sent from the feature extracting section 3 to the extracting time of each feature amount in the speech zone, and sends them to the feature-amount storage section 12 and stores them in it.

After the speech zone starts, the control section 11 also generates a node (hereinafter called an initial node) indicating the start of the speech zone, and sends it to the word-connection-information storage section 16 and stores in it in step S1. In other words, the control section 11 stores the node Node1 shown in FIG. 5 in the word-connection-information storage section 16 in step S1.

Also in step S1, extended words stored in the extended-word data base 22, as described above, are cleared (deleted).

The processing proceeds to step S2. The control section 11 determines whether an intermediate node exists by referring to the word-connection information stored in the word-connection-information storage section 16.

As described above, in the word-connection information shown in FIG. 5, arcs are connected to ending-end nodes to form a pass which extends from the start of the speech zone to the end. In step S2, among ending-end nodes, a node to which an arc has not yet been connected and which does not reach the end of the speech zone is searched for as an intermediate node (such as the nodes Node8, Node1o, and Node11 in FIG. 5), and it is determined whether such an intermediate node exists.

As described above, the speech zone is recognized by some technique, and the time corresponding to an ending-end node is recognized by referring to the time information which the ending-end node has. Therefore, whether an ending-end node to which an arc has not yet been connected does not reach the end of the speech zone is determined by comparing the end time of the speech zone with the time information which the ending-end node has.

When it is determined in step S2 that an intermediate node exists, the processing proceeds to step S3. The control section 11 selects one node from intermediate nodes included in the word-connection information as a node (hereinafter called an aimed-at node) for determining a word serving as an arc to be connected to the node.

Specifically, when only one intermediate node is included in the word-connection information, the control section 11 selects the intermediate node as an aimed-at node. When a number of intermediate nodes are included in the word-connection information, the control section 11 selects one of the number of intermediate nodes as an aimed-at node. More specifically, the control section 11 refers to the time information which each of the number of intermediate nodes has, and selects the node having the time information which indicates the oldest time (closest to the start of the speech zone), or the node having the time information which indicates the newest time (closest to the end of the speech zone), as an aimed-at node. Alternatively, for example, the control section 11 accumulates the acoustics scores and the language scores which the arcs constituting a pass extending from the initial node to each the number of intermediate nodes have, and selects the intermediate node disposed at the ending end of the pass which has the largest of accumulated values (hereinafter called partial accumulated values) or the smallest.

Then, the control section 11 outputs an instruction (hereinafter called a matching processing instruction) for performing matching processing with the time information which the aimed-at node has being used as a starting time, to the matching section 14 and to the re-evaluation section 15.

When the re-evaluation section 15 receives the matching processing instruction from the control section 11, the processing proceeds to step S4. The re-evaluation section 15 recognizes the, word string (hereinafter called a partial word string) indicated by the arcs constituting the pass (hereinafter called a partial pass) extending from the initial node to the aimed-at node, by referring to the word-connection-information storage section 16 to re-evaluate the partial word string. The partial word string is, as described later, an intermediate result of a word string serving as a candidate for the result of speech recognition, obtained by matching processing which the matching section 14 applies to words preliminary selected by the preliminary word☐selecting section 13 and to words stored in the extended-word data base 22. The re-evaluation section 15 again evaluates the intermediate result.

Specifically, the re-evaluation section 15 reads the series of feature amounts corresponding to the partial word string from the feature-amount storage section 12 to recalculate a language score and an acoustics score for the partial word string. More specifically, the re-evaluation section 15 reads, for example, the series (feature-amount series) of feature amounts related to the period from the time indicated by the time information which the initial node, the beginning node of the partial pass, has to the time indicated by the time information which the aimed-at node has, from the feature-amount storage section 12. In addition, the re-evaluation section 15 re-calculates a language score and an acoustics score for the partial word string by referring to the acoustic-model data base 17C, the dictionary data base 18C, and the grammar data base 19C with the use of the feature-amount series read from the feature-amount storage section 12. This re-calculation is performed without fixing the word boundaries of the words constituting the partial word string. Therefore, the re-evaluation section 15 determines the word boundaries of the words constituting the partial word string according to the dynamic programming method by re-calculating a language score and an acoustics score for the partial word string.

When the re-evaluation section 15 obtains the language score, the acoustics score, and the word boundaries of each word of the partial word string, the re-evaluation section 15 uses the new language scores and acoustics scores to correct the language scores and the acoustics scores which the arcs constituting the partial pass stored in the word-connection-information storage section 16 corresponding to the partial word string have, and also uses the new word boundaries to correct the time information which the nodes constituting the partial pass stored in the word-connection-information storage section 16 corresponding to the partial word string have. In the present embodiment, the re-evaluation section 15 corrects the word-connection information through the control section 11.

Figure 9:
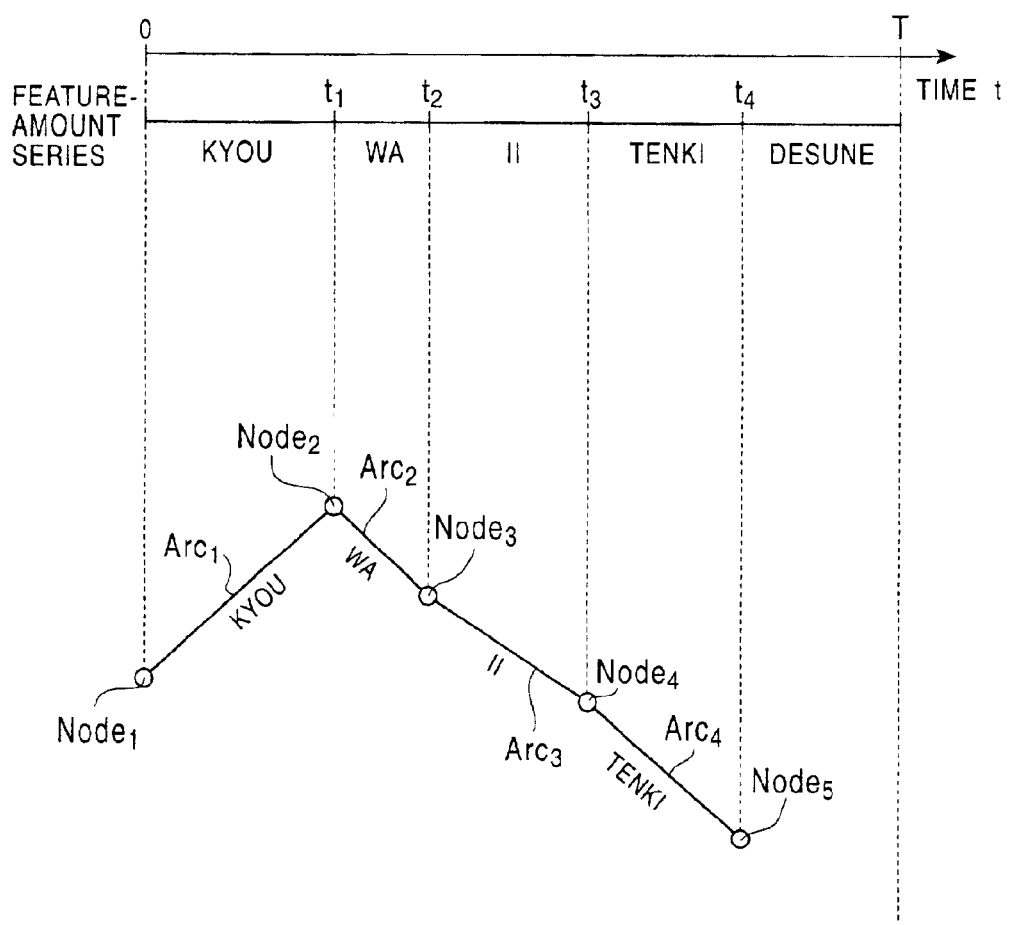
FIG. 9 is a view showing processing executed by a re-evaluation section 15 of the present invention.

When the node Node5 shown in FIG. 9 is set to an aimed-at node, for example, if a word string "ii" and "tenki" formed of the node Node3, the arc Arc3 corresponding to the word "ii," the node Node4, the arc Arco corresponding to the word "tenki," and the nodes is examined within the partial pass extending from the initial node Node 1 to the aimed-at node Node5, the re-evaluation section 15 generates word models for the words "ii" and "tenki," and calculates acoustics scores by referring to the acoustic-model data base 17C and the dictionary data base 18C with the use of the feature-amount series from the time corresponding to the node Node3 to the time corresponding to the node Node5. The re-evaluation section 15 also calculates language scores for the words "ii" and "tenki" by referring to the grammar data base 19C. More specifically, when the grammar data base 19C stores a grammar rule based on trigram, for example, the re-evaluation section 15 uses, for the word "ii," the word "wa" disposed immediately therebefore and the word "kyou" disposed one more word before to calculate the probability of a word chain "kyou," "wa," and "ii" in that order, and calculates a language score according to the obtained probability.

The re-evaluation section 15 uses, for the word "tenki," the word "ii" disposed immediately therebefore and the word "wa" disposed one more word before to calculate the probability of a word chain "wa," "ii," and "tenki" in that order, and calculates a language score according to the obtained probability. The re-evaluation section 15 accumulates acoustics scores and language scores obtained as described above, and determines the word boundary between the words "ii" and "tenki" so as to obtain the largest accumulated value. The re-evaluation section 15 uses the obtained acoustics scores and language scores to correct the acoustics scores and the language scores which the arc Arc3 corresponding to the word "ii" has and the arc Arco corresponding to the word "tenki" has, and uses the determined word boundary to correct the time information which the node Node4 corresponding to the word boundary between the words "ii" and "tenki" has.

Therefore, the re-evaluation section 15 determines the word boundaries of the words constituting the partial word string by the dynamic programming method, and sequentially corrects the word-connection information stored in the word☐connection-information storage section 16. Since the preliminary word-selecting section 13, the matching section 14, arid the extended-word selecting section 21 perform processing by referring to the corrected word-connection information, the precision and reliability of the processing are improved.

In addition, since the re-evaluation section 15 corrects word boundaries included in the word-connection information, the number of word-boundary candidates to be stored in the word-connection information can be largely reduced.

Figure 2:
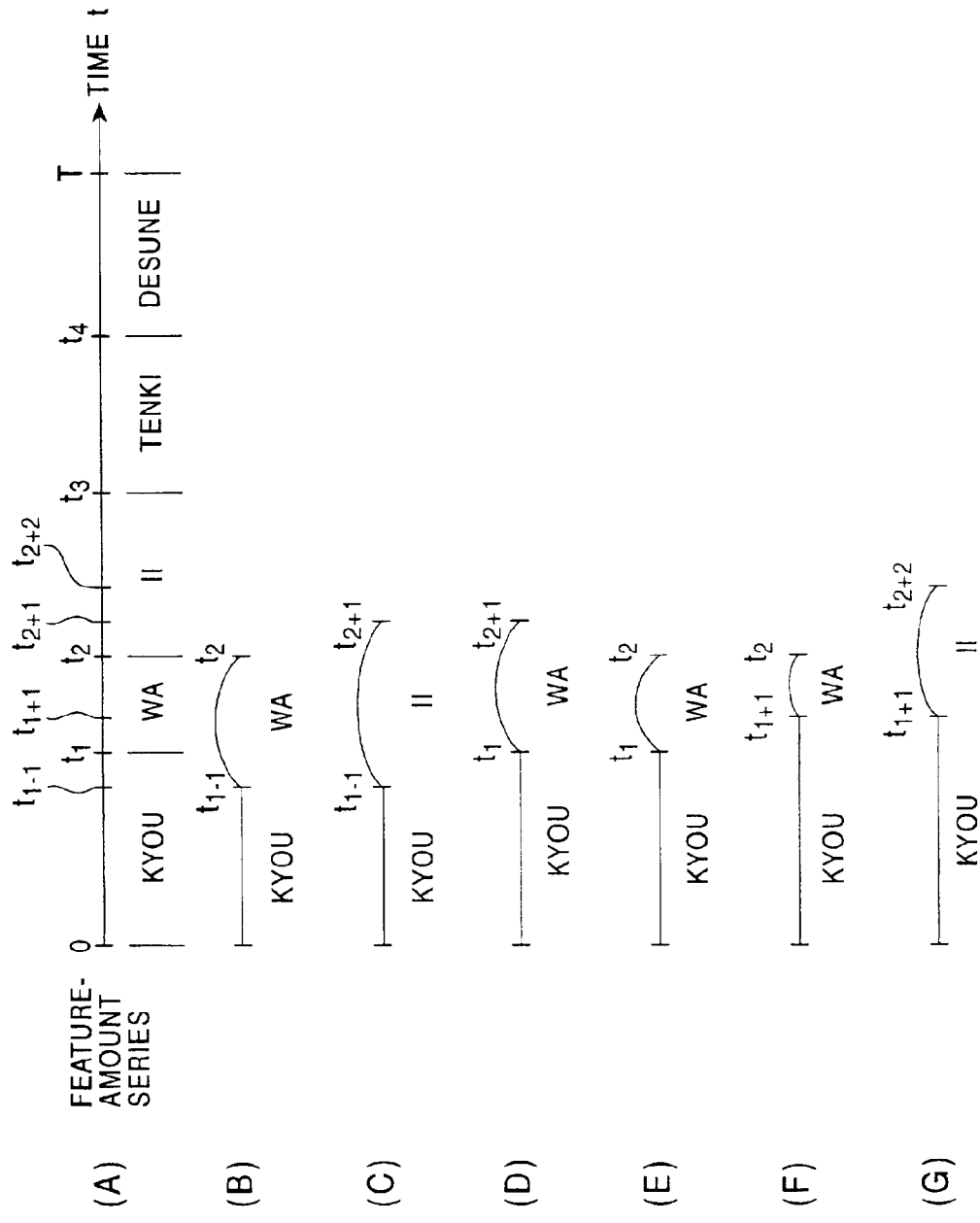
FIG. 2 is a diagram showing why candidates for boundaries between words need to be held.
Figure 3:
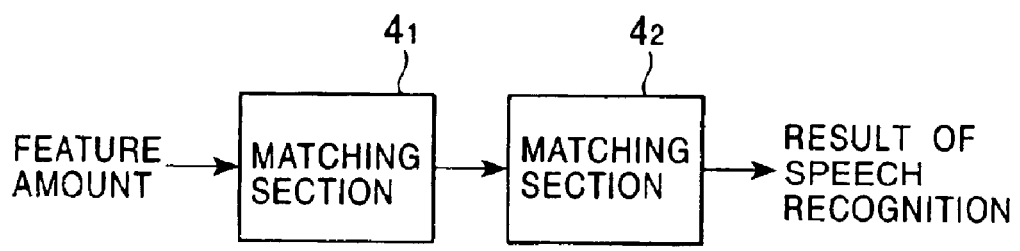
FIG. 3 is a block diagram of another conventionally known speech recognition apparatus.

In other words, conventionally, three times t1−1, t1, and t1+1 need to be held as word-boundary candidates between the words "kyou" and "wa" as described before by referring to FIG. 2. If the time t1, which is the correct word boundary, is erroneously not held, matching processing thereafter is adversely affected. In contrast, when the re-evaluation section 15 sequentially corrects word boundaries, even if only the time t1+1, which is an erroneous word boundary, is held, for example, the re-evaluation section 15 changes the time t1−1, which is an erroneous word boundary, to the time t1, which is the correct word boundary. Therefore, matching processing thereafter is not adversely affected.

The re-evaluation section 15 uses cross-word models in which words disposed before and after a target word are taken into account, for words constituting the partial word string except the top and end words to calculate acoustics scores. Words disposed before and after a target word can be taken into account also in the calculation of language scores. Therefore, highly precise processing is made possible. Furthermore, since the re-evaluation section sequentially performs processing, a large delay which occurs in two-pass decoding, described before, does not happen.

Since the matching section 14 applies matching processing to words stored in the extended-word data base 22 in addition to words preliminary selected by the preliminary word-selecting section 13, in other words, words stored in the word dictionary of the dictionary data bases 18A to 18C, a partial pass corresponding to a partial word string including an extended word, which is not a word stored in the word dictionary of the dictionary data bases 18A to 18C, is formed in some cases in the word-connection-information storage section 16.

Since the information of extended-words is not stored in the dictionary data base 18C or the grammar data base 19C, which the re-evaluation section 15 refers to, the re-evaluation section 15 cannot re-calculate the acoustics score and the language score of an extended word just by referring to the data base. Therefore, the re-evaluation section 15 further refers to the extended-word data base 22 to calculate the acoustics score and the language score of an extended word.

More specifically, as described above, the extended-word data base 22 stores the phoneme information and the language information of extended words. The re-evaluation section 15 connects acoustic models stored in the acoustic-model data base 17C according to the phoneme information of an extended word stored in the extended-word data base 22 to form a word model for the extended word, and re-calculates its acoustics score. The re-evaluation section 15 also searches the grammar data base 19C for a grammar rule to be applied to a word having the language information equal to or similar to that stored in the extended-word data base 22, and re-calculates the language score of the extended word by using the grammar rule.

When the re-evaluation section 15 has corrected the word-connection information stored in the word-connection-information storage section 16 as described above, the re-evaluation section 15 reports the completion of correction to the matching section 14 through the control section 11.

As described above, after the matching section 14 receives the matching processing instruction from the control section 11, when the matching section 14 is reported by the re-evaluation section 15 through the control section 11 that the word-connection information has been corrected, the matching section 14 sends the aimed-at node and the time information which the aimed-at node has to the preliminary word-selecting section 13 and to the extended-word selecting section 21, and asks them to apply preliminary word-selecting processing and extended-word selecting processing, respectively, and the processing proceeds to step S5.

In step S5, when the preliminary word-selecting section 13 receives the requests for preliminary word-selecting processing from the matching section 14, the preliminary word-selecting section 13 applies preliminary word-selecting processing for selecting a word candidate serving as an arc to be connected to the aimed-at node, to the words stored in the word dictionary of the dictionary data base 18A.

More specifically, the preliminary word-selecting section 13 recognizes the starting time of a series of feature amounts used for calculating a language score and an acoustics score, from the time information which the aimed-at node has, and reads the required series of feature amounts, starting from the starting time, from the feature-amount storage section 12. The preliminary word-selecting section 13 also generates a word model for each word stored in the word dictionary of the dictionary data base 11A by connecting acoustic models stored in the acoustic-model data base 17A, and calculates an acoustics score according to the word model by the use of the series of feature amounts read from the feature-amount storage section 12.

The preliminary word-selecting section 13 calculates the language score of the word corresponding to each word model according to the grammar rule stored in the grammar data base 19A. Specifically, the preliminary word-selecting section 13 obtains the language score of each word according to, for example, unigram.

It is possible that the preliminary word-selecting section 13 uses cross-word models depending on words (words corresponding to arcs having the aimed-at node as ending ends) disposed immediately before target words to calculate the acoustics score of each word by referring to the word-connection information.

It is also possible that the preliminary word-selecting section 13 calculates the language score of each word according to bigram which specifies the probability of chaining the target word and a word disposed therebefore by referring to the word-connection information.

When the preliminary word-selecting section 13 obtains the acoustics score and language score of each word, as described above, the preliminary word-selecting section 13 obtains a score (hereinafter called a word score) which is a total evaluation of the acoustics score and the language score, and sends L words having higher word scores to the matching section 14 as words to which matching processing is to be applied.

Also in step S5, after the extended-word selecting section 21 receives a request for extended-word selecting processing from the matching section 14, the extended-word selecting section 21 performs extended-word selecting processing for selecting a candidate for an extended word serving as an arc to be connected to the aimed-at node.

Figure 10:
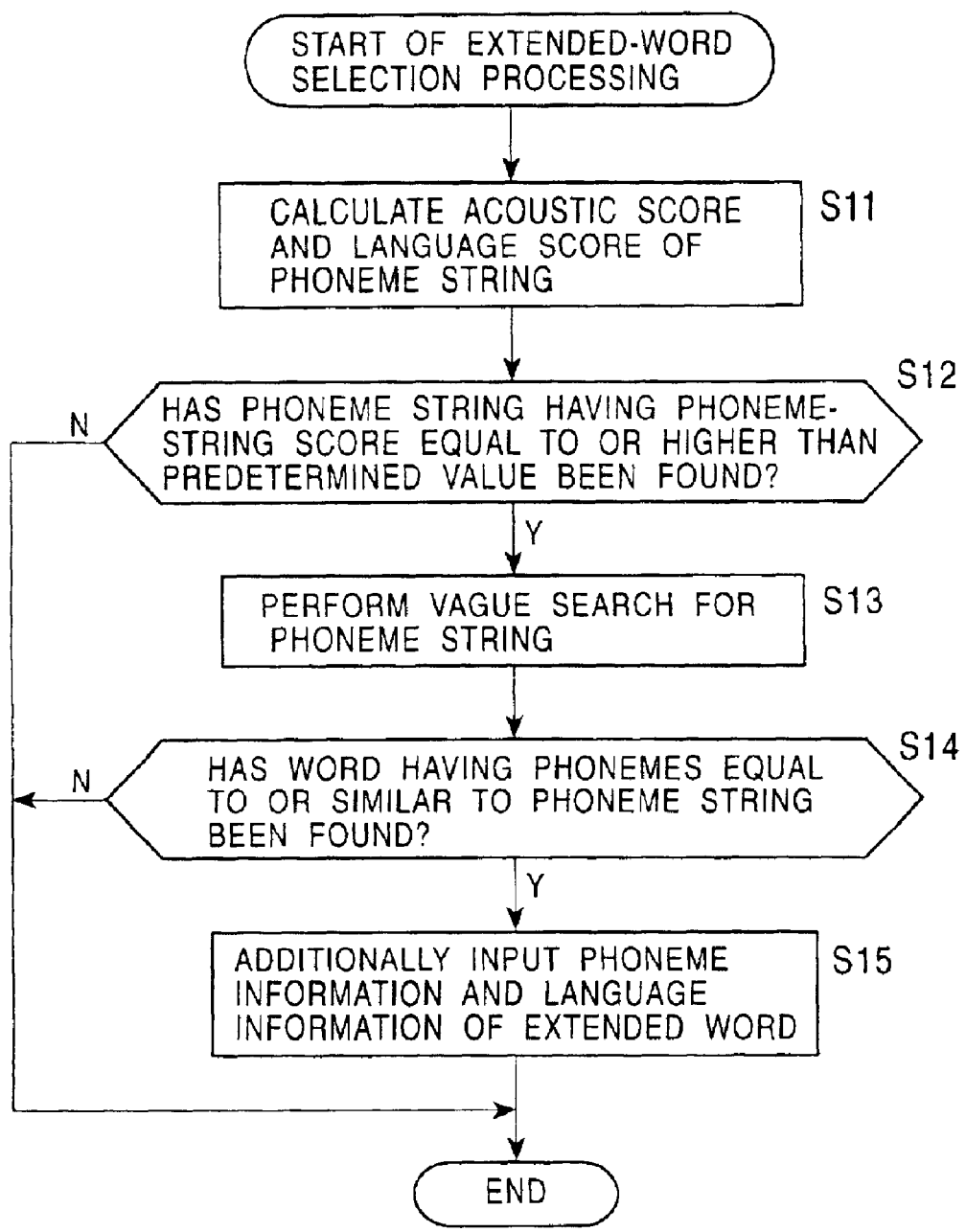
FIG. 10 is a flowchart of extended-word selecting processing executed by the extended-word selecting section 21 shown in FIG. 6.

More specifically, as shown in a flowchart of FIG. 10, in the extended-word selecting section 21 (FIG. 6), the one-pass decoder 31 first detects the starting time of a feature-amount series used for calculating the language score and the acoustics score of the phoneme string and reads the required feature-amount series starting from the starting time, from the feature-amount storage section 12 in step S11. The one-pass decoder 31 also forms a pseudo-word model for each pseudo-word stored in the pseudo-word dictionary of the dictionary data base 34 by using acoustic models stored in the acoustic-model data base 33, and calculates the acoustics score according to the pseudo-word model by using the feature-amount series read from the feature-amount storage section 12.

The one-pass decoder 31 further calculates the language score of the pseudo-word corresponding to each pseudo-word model according to the grammar rule stored in the grammar data base 35.

The processing proceeds to step S12. The one-pass decoder 31 determines whether the score (hereinafter called a phoneme-string score) obtained by totally evaluating the acoustics score and the language score of a phoneme string corresponding to a series of pseudo-word models, of the phoneme string having the highest score is equal to or higher than a predetermined value. When it is determined that the score is lower than the threshold value, extended-word selecting processing is terminated.

Therefore, in this case, an extended word is not stored in the extended-word data base 22.

When it is determined in step S12 that the phoneme-string score of the phoneme string is equal to or higher than the predetermined value, the one-pass decoder 31 outputs the phoneme string (hereinafter called an effective phoneme string) to the searching section 32, and the processing proceeds to step S13.

In step S13, the searching section 32 applies vague search to the large-vocabulary dictionary of the large-vocabulary-dictionary data base 36 with the effective phoneme string sent from the one-pass decoder 31 being set to a keyword. In other words, the searching section 32 searches the large-vocabulary-dictionary data base 36 for a word having phonemes equal to or similar to those of the phoneme string expected to be that uttered by the user.

Then, the processing proceeds to step S14. The searching section 32 determines whether a word having phonemes equal to or similar to those of the effective phoneme string is stored in the large-vocabulary dictionary of the large-vocabulary-dictionary data base 36. When it is determined that such a word is not stored, extended-word selecting processing is terminated.

Therefore, also in this case, an extended-word is not stored in the 20 extended-word data base 22.

When it is determined in step S14 that a word having phonemes equal to or similar to those of the effective phoneme string is stored in the large-vocabulary dictionary of the large-vocabulary-dictionary data base 36, the searching section 32 reads all such words from the large-vocabulary dictionary as extended words. Then, the searching 25 section 32 sends the extended words to the extended-word data base 22, stores them in an addition manner, and terminates extended-word selecting processing.

It is also possible that the one-pass decoder 31 calculates an acoustics score and a language score by referring to the word-connection information in the same way as the preliminary word-selecting section 13.

When many words having phonemes similar to those of the effective phoneme string are found in the large-vocabulary dictionary, it is possible that the searching section 32 restricts the number of words (extended words) to be input into the extended-word data base 22 according to their similarity.

Figure 8:
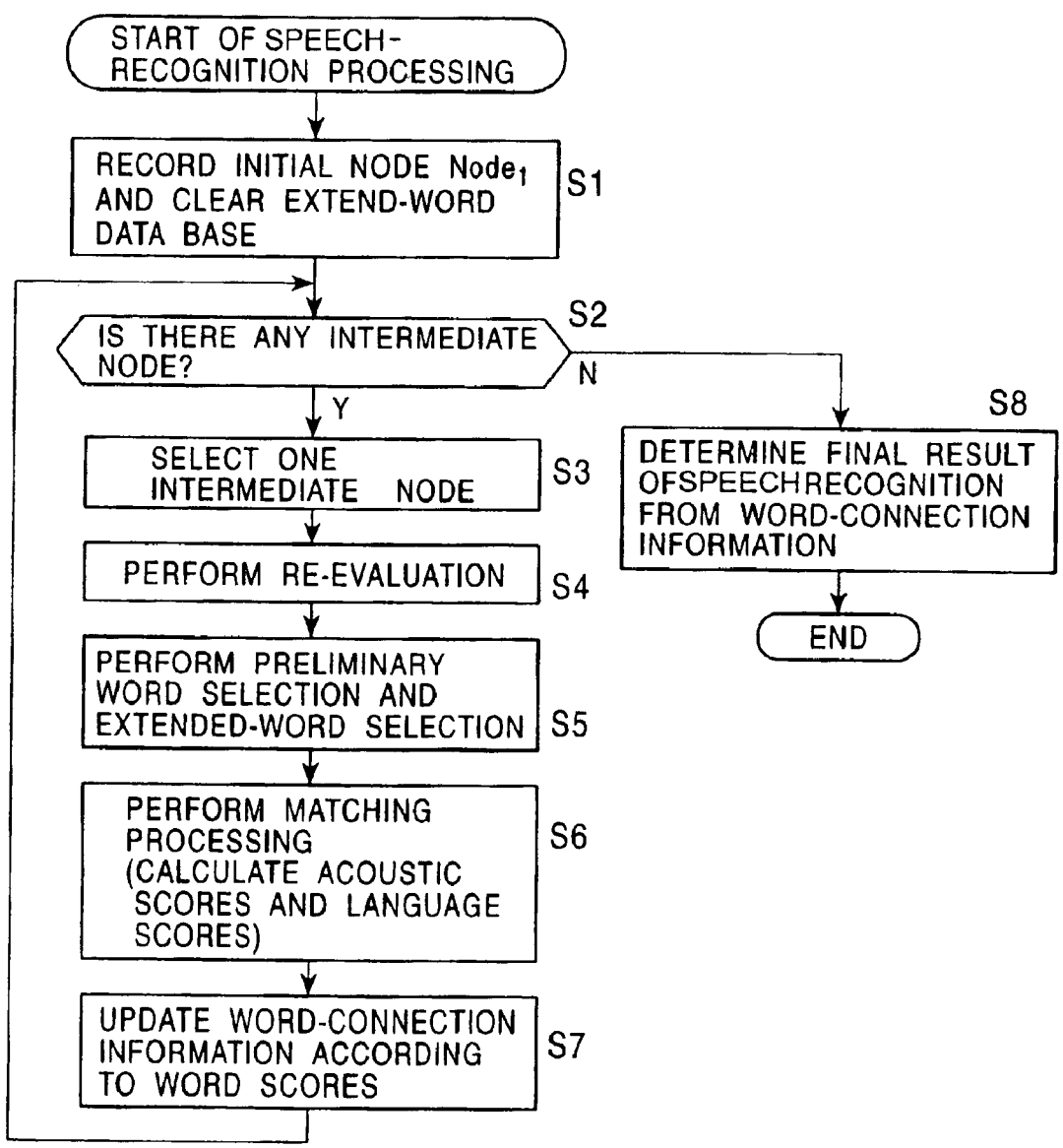
FIG. 8 is a flowchart of processing executed by the speech recognition apparatus shown in FIG. 4.

Back to FIG. 8, when the matching section 14 receives the L words used in matching processing from the preliminary word-selecting section 13, the matching section 14 applies in step S6 matching processing to the L words and also to extended words if the extended words have been stored in the extended-word data base 22 in an addition manner by extended-word selecting processing executed in step S5 immediately before step S6. Specifically, the matching section 14 recognizes the starting time of a series of feature amounts used for calculating a language score and an acoustics score, from the time information which the aimed-at node has, and reads the required series of feature amounts, starting from the starting time, from the feature-amount storage section 12.

The matching section 14 recognizes the phoneme information of the selected words sent from the preliminary word-selecting section 13 by referring to the dictionary data base 18B, reads the acoustic models corresponding to the phoneme information from the acoustic-model data base 17B, and connects the acoustic models to form word models.

The matching section 14 calculates the acoustics scores of the selected words sent from the preliminary word-selecting section 13 by the use of the feature-amount series read from the feature-amount storage section 12, according to the word models formed as described above. It is possible that the matching section 14 calculates the acoustics scores of the selected words by referring to the word-connection information, according to cross-word models.

The matching section 14 also calculates the language scores of the words sent from the preliminary word-selecting section 13 by referring to the grammar data base 19B. Specifically, the matching section 14 refers to, for example, the word-connection information to recognize words disposed immediately before the words sent from the preliminary word-selecting section 13 and words disposed one more word before, and obtains the language scores of the words sent from the preliminary word-selecting section 13 by the use of probabilities based on trigram. The matching section 14 connects acoustic models stored in the acoustic-model data base 17B according to the phoneme information of the extended words additionally stored in the extended-word data base 22 in step S5 immediately before to form word models for the extended words, and calculates the acoustics scores of the extended words by using the feature-amount series read from the feature-amount storage section 12. The matching section 14 also searches the grammar data base 19B for a grammar rule to be applied to a word having language information equal to or similar to the language information of the extended words additionally stored in the extended-word data base 22 in step S5 immediately before, and calculates the language scores of the extended words by using the grammar rule.

As described above, the matching section 14 calculates the acoustics scores and the language scores of all (hereinafter called selected words) of the L words sent from the preliminary word-selecting section 13 and the extended words additionally stored in the extended-word data base 22 in step S5 immediately before, and the processing proceeds to step S7. In step S7, for each selected word, a word score indicating the total evaluation of the acoustics score and the language score of the selected word is obtained. The word-connection information stored in the word-connection-information storage section 16 is updated according to the word scores.

In other words, in step S7, the matching section 14 obtains the word scores of the selected words and, for example, compares the word scores with a predetermined threshold to narrow the selected words down to words which can serve as an arc to be connected to the aimed-at node. Then, the matching section 14 sends the words obtained by narrowing down to the control section 11 together with the acoustics scores thereof, the language scores thereof, and the ending times thereof.

The ending time of each word is recognized from the extracting time of the feature amount used for calculating the acoustics score. When a number of extracting times which are highly likely to serve as the ending time of a word are obtained, sets of each ending time, the corresponding acoustics score, and the corresponding language score of the word are sent to the control section 11.

When the control section 11 receives the acoustics score, language score, and ending time of each word from the matching section 14, as described above, the control section uses the aimed-at node in the word-connection information (FIG. 5) stored in the word-connection-information storage section 16 as a starting node, extends an arc, and connect the arc to the ending-end node corresponding to the ending time, for each word. The control section 11 also assigns to each arc the corresponding word, the corresponding acoustics score, and the corresponding language score, and gives the corresponding end time as time information to the ending-end node of each arc. Then, the processing returns to step S2, and the same processes are repeated.

As described above, the word-connection information is sequentially updated according to the results of processing executed in the matching section 14, and further, sequentially updated by the re-evaluation section 15. Therefore, it is made possible that the preliminary word-selecting section 13, the matching section 14, and the extended-word selecting section 21 always use the word-connection information for their processing. The control section 11 integrates, if possible, two ending-end nodes into one, as described above, when updating the word-connection information.

When it is determined in step S2 that there is no intermediate node, the processing proceeds to step S8. The control section 11 refers to the word-connection information to accumulate word scores for each pass formed in the word-connection information to obtain the final score, outputs, for example, the word string corresponding to the arcs constituting the pass which has the highest final score as the result of speech recognition for the user's utterance, and terminates the processing.

As described above, the extended-word selecting section 21 calculates scores (phoneme-string scores) for phoneme strings each formed of one or more phonemes, and searches the large-vocabulary dictionary for words having phonemes equal to or similar to those of a phoneme string having a score equal to or higher than a predetermined threshold. Then, the matching section 14 calculates scores for the words selected by the extended-word selecting section 21 in addition to the words preliminarily selected by the preliminary word-selecting section 13. The control section 11 determines a word string serving as the result of recognition of the speech. Consequently, highly precise, high-speed speech recognition is applied to a large vocabulary.

Figure 6:
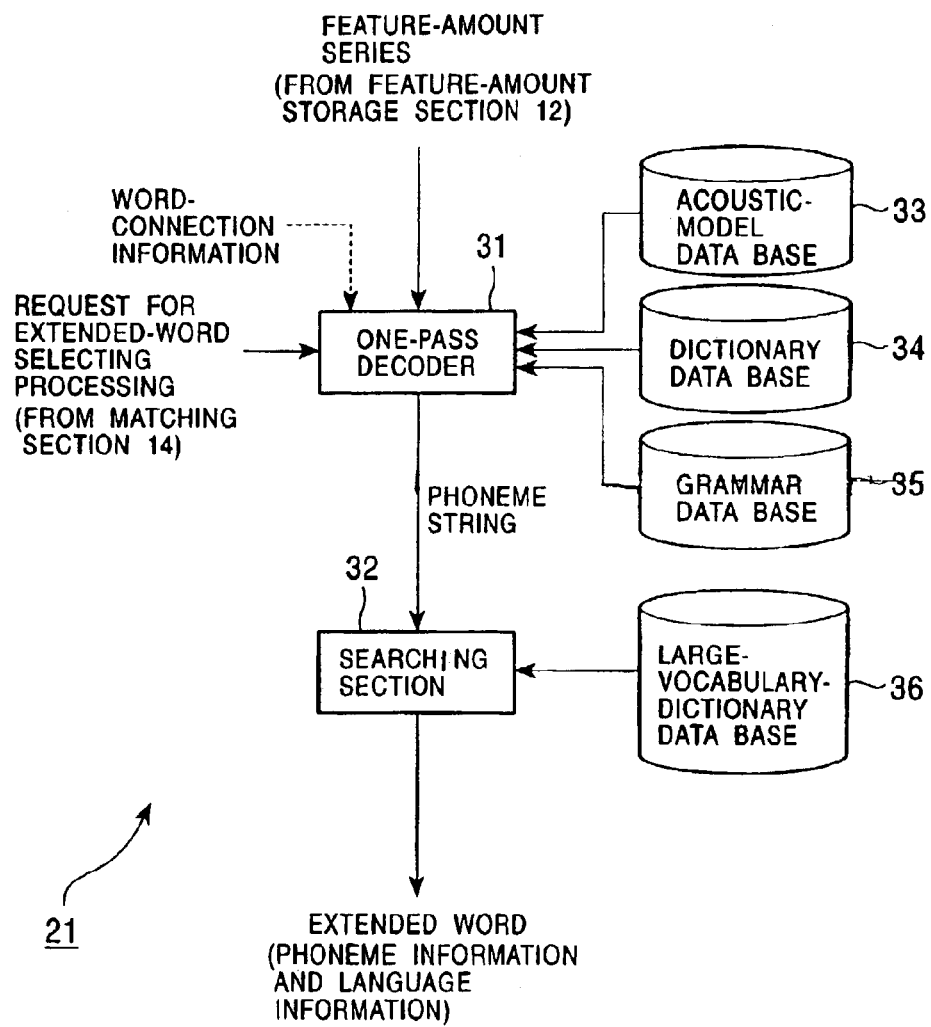
FIG. 6 is a block diagram showing an example structure of an extended-word selecting section 21 shown in FIG. 4.

Words (unknown words) not stored in the word dictionary of the dictionary data bases 18A to 18C are stored in the large-vocabulary dictionary of the large☐vocabulary-dictionary data base 36 (FIG. 6). Consequently, when the extended-word selecting section 21 searches the large-vocabulary dictionary, the unknown words are to be speech-recognized. Since the extended-word selecting section 21 searches the large-vocabulary dictionary according to a degree in which a character string serving as a phoneme string of the user's speech matches a character string serving as the phoneme information of a word, irrespective of the topic which the user talks about, this searching can be performed at a very high speed. Therefore, even if about one million words are stored in the large-vocabulary dictionary of the large-vocabulary-dictionary data base 36, it does not much affect the real-time operation of the speech recognition apparatus.

As a result, since speech recognition is substantially applied to the words stored in the large-vocabulary dictionary of the large-vocabulary-dictionary data base 36 in addition to the words stored in the word dictionary of the dictionary data bases 18A to 18C, it is allowed that highly precise, high-speed speech recognition is applied to a large vocabulary. The series of processing described above can be implemented by hardware or software. When the series of processing is achieved by software, a program constituting the software is installed into a general-purpose computer and the like.

Figure 11:
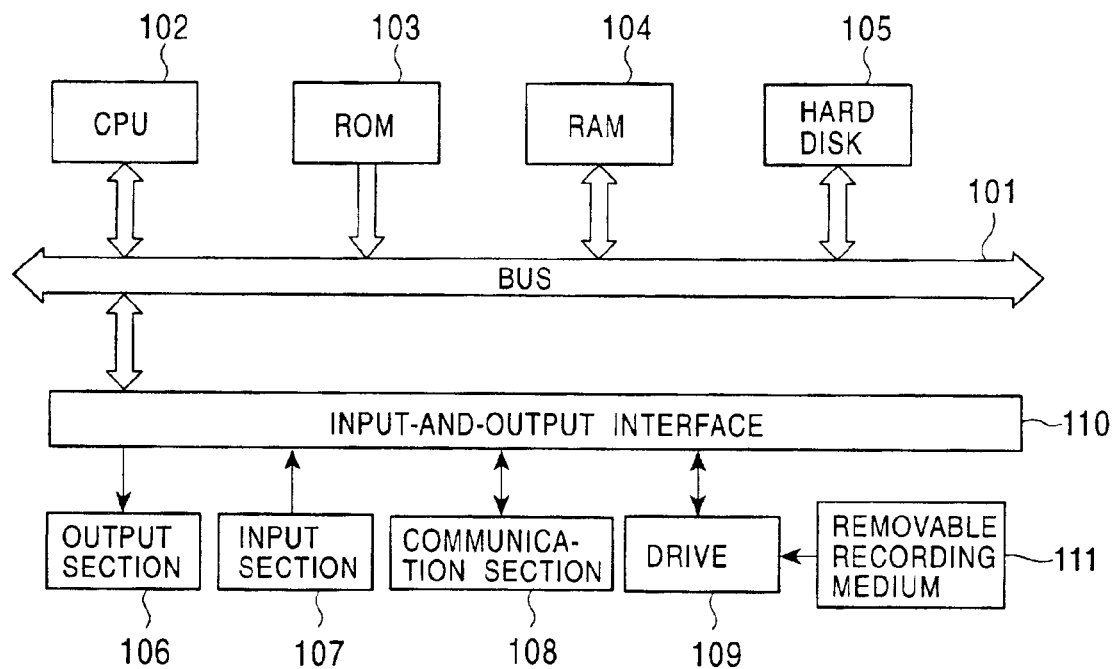
FIG. 11 is a block diagram of a computer according to another 10 embodiment of the present invention.

FIG. 11 shows an example structure of a computer in which a program for executing the series of processing described above is installed, according to an embodiment.

The program can be recorded in advance into a hard disk 105 or a read-only memory (ROM) 103 serving as a recording medium which is built in the computer.

Alternatively, the program is recorded temporarily or perpetually into a removable recording medium 111, such as a floppy disk, a compact disc read-only memory (CD-ROM), a magneto-optical (MO) disk, a digital versatile disk (DVD), magnetic disk, or a semiconductor memory. Such a removable recording medium 111 can be provided as so-called package software.

The program may be installed from the removable recording medium 111, described above, to the computer. Alternatively, the program is transferred by radio from a downloading site to the computer through an artificial satellite for digital satellite broadcasting, or to the computer by wire through a network such as a local area network (LAN) or the Internet; is received by a communication section 108 of the computer; and is installed into the hard disk 105, built in the computer.

The computer includes a central processing unit (CPU) 102. The CPU 102 is connected to an input and output interface 110 through a bus 101. When the user operates an input section 107 formed of a keyboard, a mouse, and a microphone to input a command through the input and output interface 110, the CPU 102 executes a program stored in the ROM 103 according to the command. Alternatively, the CPU 102 loads into a random access memory (RAM) 104 a program stored in the hard disk 105; a program transferred through a satellite or a network, received by the communication section 108, and installed into the hard disk 105; or a program read from the removable recording medium 111 mounted to a drive 109, and installed into the hard disk 105; and executes it. The CPU executes the processing illustrated in the above flowchart, or processing performed by the structure shown in the above block diagram. Then, the CPU 102 outputs the processing result as required, for example, through the input and output interface 110 from an output section 106 formed of a liquid crystal display (LCD) and a speaker; transmits the processing result from the communication section 108; or records the processing result in the hard disk 105.

In the present specification, the steps describing the program for making the computer execute various types of processing are not necessarily executed in a time-sequential manner in the order described in the flowchart and include processing (such as parallel processing or object-based processing) executed in parallel or separately.

The program may be executed by one computer or may be distribution-processed by a number of computers. The program may also be transferred to a remote computer and executed.

Since words for which the matching section 14 calculates scores have been selected in advance by the preliminary word-selecting section 13 and the extended-word selecting section 21, the matching section 14 can calculate scores for each word independently without forming a tree-structure network in which a part of acoustics-score calculation is shared, as described above. In this case, the capacity of a memory used by the matching section 14 to calculate scores for each word is suppressed to a low level. In addition, in this case, since each word can be identified when a score calculation is started for the word, a wasteful calculation is prevented which is otherwise performed because the word is not identified.

The matching section 14 and the re-evaluation section 15 can calculate scores for each word independently in terms of time. In this case, the same memory required for the score calculation can be shared to suppress the required memory capacity to a low level.

The speech recognition apparatus shown in FIG. 4 can be applied to speech interactive systems used in a case in which a data base is searched by speech, in a case in which various types of units are operated by speech, and in a case in which data is input to each unit by speech. More specifically, for example, the speech recognition apparatus can be applied to a data-base searching apparatus for displaying map information in response to an inquiry of the name of a place by speech, an industrial robot for classifying materials in response to an instruction by speech, a dictation system for generating texts in response to a speech input instead of a keyboard input, and an interactive system in a robot for talking with a user.

In the present embodiment, since one type of phoneme information is stored for each word in the large-vocabulary dictionary of the large-vocabulary-dictionary data base 36 (FIG. 6), when a word stored in the large-vocabulary dictionary is selected by the searching section 32 and input into the extended-word data base 22, the matching section 14 forms a word model by using just one type of phoneme information for each word stored in the extended-word data base 22. When the large-vocabulary-dictionary data base 36A has a sufficient memory capacity, it is possible that a plurality of types of phoneme information are stored for each word in the large-vocabulary dictionary. In this case, it is possible that the matching section 14 forms a number of word models by using the plurality of types of phoneme information for each word stored in the extended-word data base 22, and calculates more precise acoustics scores. In addition, in this case, it is possible that the searching section 32 applies vague word searching to the large-vocabulary dictionary by using the number of types of phoneme information.

According to the speech recognition apparatus, the speech recognition method, and the recording medium of the present invention, a phoneme string formed of one or more phonemes is detected correspondingly to a speech, and a word having one or more phonemes equal to or similar to those of the phoneme string is searched for. A score is calculated at least for the word searched for, and a word string serving as the result of recognition of the speech is determined according to the calculated score. Therefore, it is allowed that highly precise, high-speed speech recognition is applied to a large vocabulary.

Although the present invention has been described with reference to specific embodiments, those of skill in the art will recognize that changes may be made thereto without departing from the spirit and scope of the invention as set forth in the hereafter appended claims.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

We claim as our invention:

1. A speech recognition apparatus, comprising:

an input device for receiving a speech input;

a processing device for digitally extracting data from the speech input a control device, said control device forming a phoneme string from said digitally extracted data, and wherein said phoneme string comprises of one or more phonemes;

a preliminary processing device, wherein said preliminary processing device searches words stored in a database to determine which words have one or more phonemes equal to or similar to those of the phoneme string, and generates a preliminary score for each determined word, said preliminary processing device further identifying preliminary scores to identify phoneme strings meeting or exceeding a first threshold;

an extended processing device, wherein said extended processing device searches pseudo-words stored in a database to determine which pseudo-words have one or more phonemes equal or similar to those of the phoneme strings that were determined to have a preliminary score that met or exceeded said first threshold, and generating a secondary score to identify phoneme strings meeting or exceeding a second threshold;

a searching device, coupled to said extended processing device, wherein said searching device searches words stored in a database to determine which words have one or more phonemes equal or similar to those of the phoneme strings that were determined to have a secondary score that met or exceeded said second threshold; and a storage area, wherein the words having one or more phonemes equal or similar to the phoneme strings that were determined to have a secondary score that met or exceeded said second threshold are stored in said storage area.

2. A speech recognition apparatus according to claim 1, wherein the extended processing device further comprises a decoder.

3. A speech recognition apparatus according to claim 1, further comprising large-vocabulary-dictionary storage means for storing a large-vocabulary word dictionary, wherein the searching device searches the large-vocabulary word dictionary.

4. A speech recognition apparatus according to claim 3, wherein the large-vocabulary word dictionary stores words together with their phoneme information and linguistic information.

5. A speech recognition apparatus according to claim 1, wherein the searching device further comprising a selecting device for selecting a word according to the secondary scores generated by said extended processing device, wherein a final score is calculated by said selecting device for words searched for by the searching device and for the word selected by the selecting device.

6. A method for calculating words used during speech recognition, comprising:

receiving a speech input;

digitally extracting data from the speech input forming a phoneme string from said digitally extracted data, and wherein said phoneme string comprises of one or more phonemes;

performing a preliminary search of words stored in a database to determine which words have one or more phonemes equal to or similar to those of the phoneme string;

generating a preliminary score for each word determined to have one or more phonemes equal to or similar to those of the phoneme string;

identifying phoneme strings that meet or exceed a first threshold;

searching pseudo-words stored in a database to determine which pseudo-words have one or more phonemes equal or similar to those of the phoneme strings that were determined to have a preliminary score that met or exceeded said first threshold;

generating a secondary score to identify phoneme strings that meet or exceed a second threshold;

searching words stored in a database to determine which words have one or more phonemes equal or similar to those of the phoneme strings that were determined to have a secondary score that met or exceeded said second threshold; and storing the words having one or more phonemes equal or similar to the phoneme strings that were determined to have a secondary score that met or exceeded said second threshold.

7. A computer-readable storage medium containing a set of instructions for a general purpose computer, the set of instructions comprising the steps of:

digitally extracting data from a speech input;

forming a phoneme string from said digitally extracted data, and wherein said phoneme string comprises of one or more phonemes;

performing a preliminary search of words stored in a database to determine which words have one or more phonemes equal to or similar to those of the phoneme string;

generating a preliminary score for each word determined to have one or more phonemes equal to or similar to those of the phoneme string;

identifying phoneme strings that meet or exceed a first threshold;

searching pseudo-words stored in a database to determine which pseudo-words have one or more phonemes equal or similar to those of the phoneme strings that were determined to have a preliminary score that met or exceeded said first threshold;

generating a secondary score to identify phoneme strings that meet or exceed a second threshold;

searching words stored in a database to determine which words have one or more phonemes equal or similar to those of the phoneme strings that were determined to have a secondary score that met or exceeded said second threshold; and storing the words having one or more phonemes equal or similar to the phoneme strings that were determined to have a secondary score that met or exceeded said second threshold.

* * * * *